(12) United States Patent
Shinkai et al.

(10) Patent No.: US 8,041,189 B2
(45) Date of Patent: Oct. 18, 2011

(54) INFORMATION PROCESSING DEVICE AND METHOD, PROGRAM, AND RECORDING MEDIUM

(75) Inventors: Mitsutoshi Shinkai, Kanagawa (JP); Takayoshi Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1492 days.

(21) Appl. No.: 10/514,946

(22) PCT Filed: Mar. 31, 2004

(86) PCT No.: PCT/JP2004/004706
§ 371 (c)(1),
(2), (4) Date: Nov. 18, 2004

(87) PCT Pub. No.: WO2004/090902
PCT Pub. Date: Oct. 21, 2004

(65) Prior Publication Data
US 2005/0183018 A1    Aug. 18, 2005

(30) Foreign Application Priority Data
Apr. 4, 2003   (JP) ................................ 2003-101842

(51) Int. Cl.
*H04N 5/93*    (2006.01)

(52) U.S. Cl. ......... 386/281; 386/283; 386/284; 386/288

(58) Field of Classification Search ............ 386/52, 386/55, 45, 112, 124, 126, 95, 40; 360/13, 360/65
See application file for complete search history.

(56) References Cited

U.S. PATENT DOCUMENTS

| | | | |
|---|---|---|---|
| 6,151,443 A | 11/2000 | Gable et al. | |
| 6,816,666 B1* | 11/2004 | Kanai et al. | 386/52 |
| 6,947,926 B2* | 9/2005 | Enokida et al. | 1/1 |
| 2001/0036356 A1 | 11/2001 | Weaver et al. | |
| 2001/0052050 A1* | 12/2001 | Hirose et al. | 711/112 |

(Continued)

FOREIGN PATENT DOCUMENTS
EP    0 980 071 A1    2/2000
(Continued)

OTHER PUBLICATIONS
International Search Report dated Jul. 13, 2004.
(Continued)

*Primary Examiner* — Jamie Atala
(74) *Attorney, Agent, or Firm* — Rader, Fishman & Grauer PLLC

(57) ABSTRACT

The present invention relates to an information processing device, an information processing method, an information processing program, and a recording medium for said program, which are designed to facilitate the editing process and permit the recording medium to be used conveniently. The edit list editing unit 55 generates the edit list (which is information about the result of editing) according to information of various kinds which has been generated by editing in the clip data editing unit 54. The resulting edit list is stored in the memory unit 63. At this time, the edit list editing unit 55 generates the clip metadata for the edit list according to the clip metadata of the clips to be edited, which do not need to be in real time. The edit list editing unit 55 generates the discontinuous point of the LTC corresponding to the video data of the clip to be edited and also generates the conversion table for the frame number. The present invention will be applied to the assistance system for video program production.

16 Claims, 12 Drawing Sheets

U.S. PATENT DOCUMENTS

| | | | |
|---|---|---|---|
| 2003/0026592 A1 | 2/2003 | Kawahara et al. | |
| 2003/0052910 A1* | 3/2003 | Shiiyama | 345/719 |

FOREIGN PATENT DOCUMENTS

| | | |
|---|---|---|
| EP | 0 989 756 A2 | 3/2000 |
| JP | 6-233226 | 8/1994 |
| JP | 8-221955 | 8/1996 |
| JP | 09-233387 | 3/1997 |
| JP | 2001-351365 | 12/2001 |
| JP | 2002-271395 | 9/2002 |
| JP | 2003-92723 | 3/2003 |
| WO | WO99/40586 | 8/1999 |
| WO | WO 02/073960 A1 | 9/2002 |

OTHER PUBLICATIONS

Supplemental European Search Report dated May 8, 2008 for corresponding European Application No. 04 72 4868.

Wilkinson, J.H., Sony BPE, U.K. & Cox M. E., Mirador Techniques, U.K. The SMPTE Unique Material Identifier (UMID) & its Applications, pp. 1-10, MPEG-7 Systems published Jul. 1999, Vancouver.

Proposed SMPTE Standard for Television, Splice Points for MPEG-2 Transport Streams, SMPTE Journal, Oct. 1998, pp. 2-20, XP-000793004.

European Patent Office ~ Communication Pursuant to Article 94(3) EPC; Application No. 04 724 868.7-2223; Dated: Aug. 29, 2008.

European Communication Pursuant to Article 94(3) EPC issued Mar. 23, 2010 for corresponding European Application No. 04 724 868.7.

Priviate SMPTE Technical Committee Document "Meta Dictionary Structure," XP30035104 SMPTE 335M, pp. 1-3, 6, Jan. 2000.

European Patent Summons to Attend Oral Proceedings Pursuant to Rule 115(1) EPC issued on May 12, 2011 for corresponding European Application No. 04724868.7-2223/1612796.

* cited by examiner

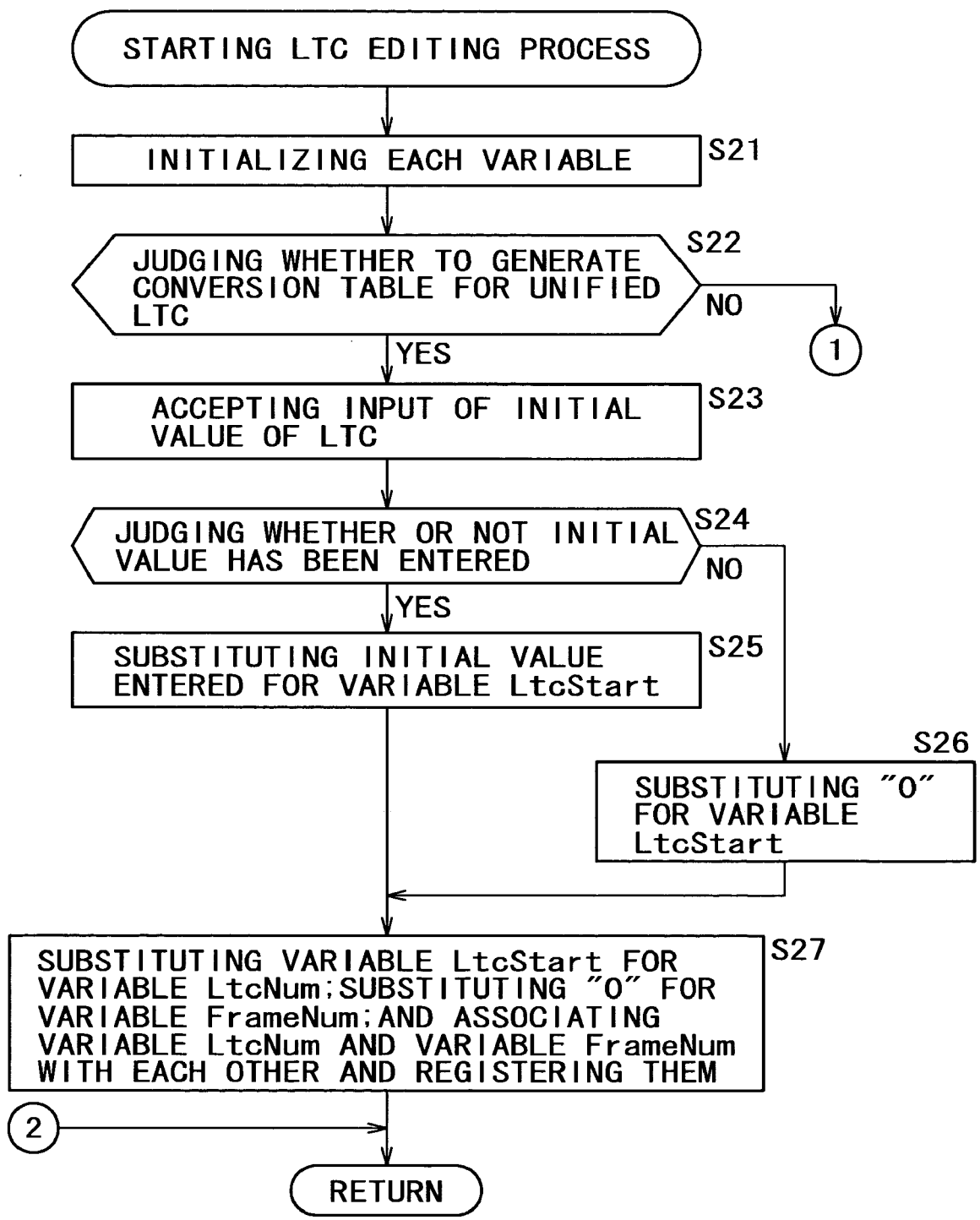
F I G. 9

INFORMATION PROCESSING DEVICE AND METHOD, PROGRAM, AND RECORDING MEDIUM

TECHNICAL FIELD

The present invention relates to an information processing device, an information processing method, an information processing program, and a recording medium for said program, which are designed to facilitate the editing process.

BACKGROUND ART

It has recently become common practice to record video and audio data obtained by shooting in such a way that they are incorporated with additional information for their editing. (See, for example, Japanese Patent Laid-open No. 2001-292421, pp. 14-15, FIG. 8.)

The additional information may be metadata such as LTC (Linear Time Code), which is recorded in a recording medium together with the video and audio data. The editor uses this LTC for editing, thereby searching video and audio data, synthesizing several clips into one cut, and determining the timing (frame) to join clips together. In this case, the result of the editing of video and audio data is the edit list which is controlled as a file separate from the original clip data.

In other words, the editing of video and audio data yields the bridge essence file which is information resulting from the editing of individual pieces of data. The bridge essence file functions as the edit list which is controlled for individual edit units. The bridge essence file is a file to reproduce the video and audio data of original clips according to the content of the edit list (which is the result of editing), and hence it contains information about the procedure for reproduction. Thus the edit list permits the user to reproduce the result of editing of video and audio data. In other words, the edit list permits the user to carry out the (non-destructive) editing work without updating the video and audio data in the original clips.

In the above-mentioned procedure, however, the LTC is processed in the same way as the video and audio data. A problem in this situation is that when one cut is produced from several clips, it is difficult to unify the LTC in that cut. For example, if the user is to produce one cut from several clips containing mutually independent LTCs, he has to do the following to unify the LTCs after editing. That is, the user adds the LTC to the clips by foreseeing their synthesis, or the user rewrites directly the LTC data contained in the original several clips.

Thus, the above-mentioned procedure would be inconvenient in the case where the user wants to carry out (non-destructive) editing, such as synthesis of clips, without affecting data in the original clips.

If there exist a plurality of clips corresponding to the results of each editing, then there exist also a plurality of files of metadata containing LTC because LTC is produced for each clip. Thus, if video and audio data are to be read by using the edit list, it is also necessary to read the file of metadata containing LTCs. The disadvantage of the procedure mentioned above is that it takes a long time with an increased load to reproduce video and audio data based on the results of editing.

DISCLOSURE OF THE INVENTION

With the foregoing in mind, the present invention was completed to use the recording medium more conveniently for easy editing.

The first aspect of the present invention is directed to an information processing device designed to perform editing on the first data, thereby generating the second data, and control the second data as a file different from the file of the first data, which comprises a metadata generating means to generate the second metadata as the metadata corresponding to the second data based on the first metadata as the metadata corresponding to the first data, and a metadata registering means to register the second metadata generated by said metadata generating means in a file which is different from the file of the first metadata.

The information processing device as defined in the first aspect above is characterized in that the first metadata and the second metadata are metadata composed of information not requiring real time processing at the time of reproduction.

The information processing device as defined in the first aspect above is characterized in that the first data and second data contain image data, the first metadata contains a first table which associates the first position information, which indicates the absolute position of each frame of the image data contained in the first data, with the second position information, which indicates the relative position (with reference to the head frame) of each frame of the image data contained in the first data, and the second metadata contains a second table which associates the third position information, which indicates the absolute position of each frame of the image data contained in the second data, with the fourth position information, which indicates the relative position (with reference to the head frame) of each frame of the image data contained in the second data.

The information processing device as defined in the third aspect above is characterized in that the fourth position information is a time code which indicates the relative position of the frame by using the frame number indicating the number of frames counted from the head frame of the image data contained in the second data.

The information processing device as defined in the third aspect above is characterized in that the second table is one which associates the third position information with the fourth position information, with the value of the third position information being at the discontinuous point of the frame which does not continue to the immediately preceding frame.

The information processing device as defined in the third aspect above is characterized in that the third position information is one which is generated by the metadata generating means independently of the first position information and is a time code which indicates the absolute position of each frame of the image data contained in the second data by using the time information based on a prescribed time.

The information processing device as defined in the third aspect above is characterized in that the third position information is one which is generated by the metadata generating means independently of the first position information and is a time code which indicates the absolute position of each frame of the image data contained in the second data by using the actual time.

The information processing device as defined in the third aspect above is characterized in that the third position information is a time code which indicates the absolute position of each frame of the image data contained in the second data, said time code being generated by the metadata generating means by using the first position information corresponding to the first data used for editing.

The information processing device as defined in the first aspect above is characterized in that the first metadata contains UMID to specify the first data and the second metadata contains UMID to specify the second data.

The information processing device as defined in the first aspect above is characterized in that the first metadata and the second metadata are data which have been encoded by a predetermined system.

The information processing device as defined in the first aspect above is characterized in that the file containing the first metadata is arranged in the same directory as that for the file containing the first data, and the file containing the second metafile is arranged in the same directory as that for the file containing the second data.

The fourth aspect of the present invention is directed to an information processing method which comprises a metadata generating step to generate the second metadata as the metadata corresponding to the second data based on the first metadata as the metadata corresponding to the first data, and a file registering step to register the second metadata generated by said metadata generating step in a file which is different from the file of the first metadata.

The fifth aspect of the present invention is directed to a program which permits the computer to realize a metadata generating step to generate the second metadata as the metadata corresponding to the second data based on the first metadata as the metadata corresponding to the first data, and a file registering step to register the second metadata generated by said metadata generating step in a file which is different from the file of the first metadata.

The sixth aspect of the present invention is directed to a recording medium for a program including a metadata generating step to generate the second metadata as the metadata corresponding to the second data based on the first metadata as the metadata corresponding to the first data, and a file registering step to register the second metadata generated by said metadata generating step in a file which is different from the file of the first metadata.

According to the present invention, the information processing device, method, and program, and the recording medium are characterized in that the second metadata as the metadata corresponding to the second data is generated based on the first metadata as the metadata corresponding to the first data, and the thus generated second metadata is registered in a file which is different from the file of the first metadata.

BRIEF DESCRIPTION OF THE DRAWINGS

FIG. 9 is a flowchart illustrating the LTC editing process executed in Step S4 shown in FIG. 8.

BEST MODE FOR CARRYING OUT THE INVENTION

The embodiments of the present invention will be described below with reference to the accompanying drawings.

Figure 1:
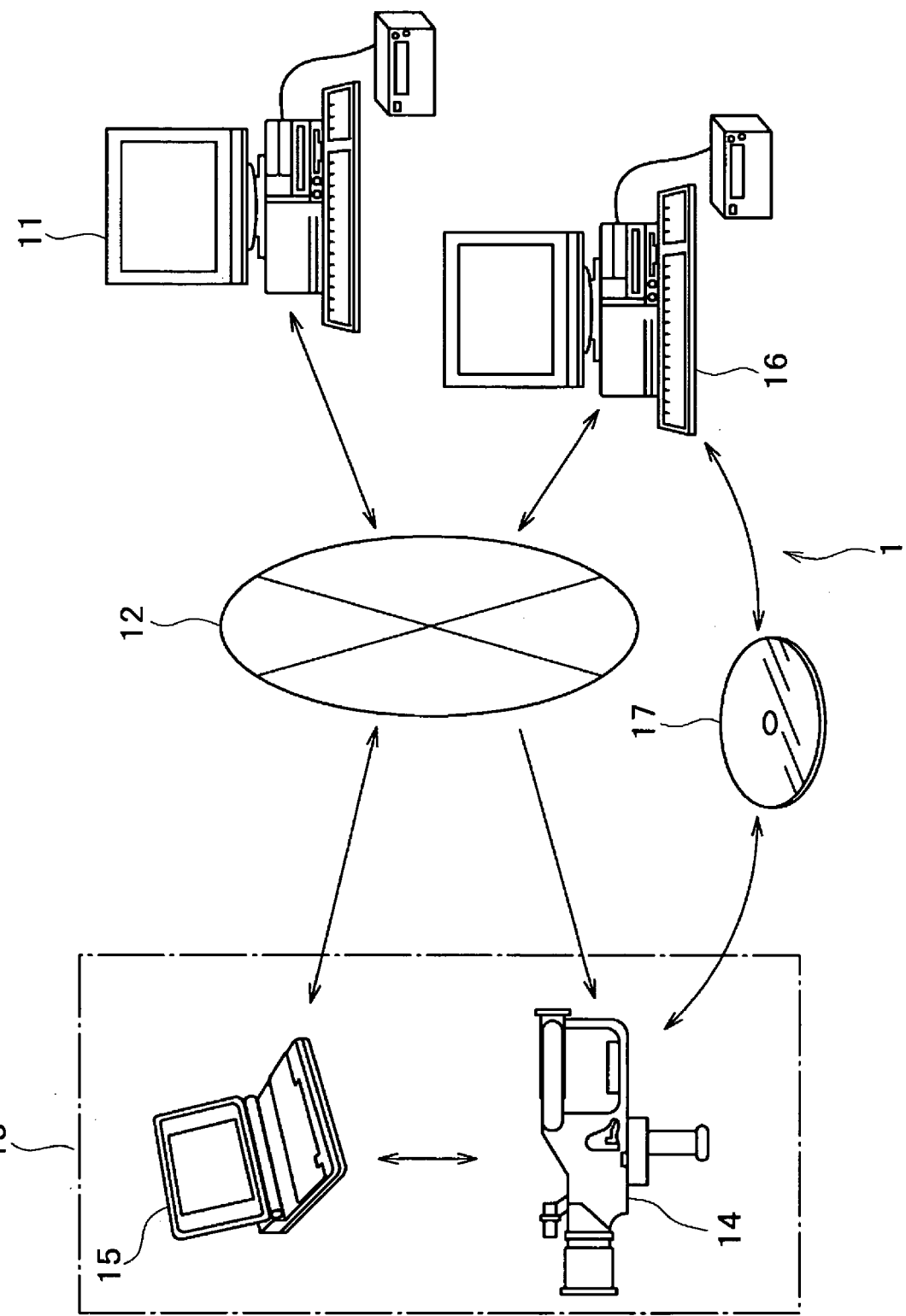
FIG. 1 is a diagram showing an example of the configuration of the assistance system for video program production to which the present invention is applied.

There is shown in FIG. 1 the assistance system for video program production, which is indicated by the reference numeral 1. It is used in TV broadcasting stations and video and film producing companies in order to produce television programs and films. It permits the metadata added to the video program (in the form of electronic file) to be used throughout several sections in charge of video program production, thereby improving the efficiency of video program production.

As shown in FIG. 1, the assistance system for video program production is made up of a planning terminal device 11 used for the planning of image programs, a network 12 to which is connected the planning terminal device 11, and a data collecting terminal device 13 connected to the network 12. The data collecting terminal device 13 is made up of an imaging device 14 and a field PC/PDA 15 (Personal Computer/Personal Digital Assistants) (referred to as field PC hereinafter). The assistance system also includes an editing terminal device 16 connected to the network 12 and an optical disk 17 as a recording medium.

The planning terminal device 11 is made up of an information processing device (such as personal computer) and its peripheral devices. It is installed in the planning section where the planning of video programs is carried out. The planning section supervises all operations for production of video programs. It plans video programs to be produced and writes scenarios for video programs and instructs other sections (such as data collecting section and editing section mentioned later) what to do for the video programs. The planning terminal device 11 produces the configuration table metadata (in the form of electronic file) for each video program. The configuration table metadata contains instructions for production corresponding to the scenarios for video programs. Then, the planning terminal device 11 supplies the resulting configuration table metadata to the data collecting terminal device 13 through the network 12. In this way the planning section tells the data collecting section about the scenes and things to be shot.

The data collecting terminal device 13 is one which is used for data collection by the data collecting section. It includes an imaging device 14 and a field PC 15. The data collecting section collects data at the spot according to instructions and scenarios received from the planning section. It shoots scenes constituting video programs and collects data about how scenes are shot.

The imaging device 14 is a video camera (such as Camcorder®) which is used to collect materials for broadcasting news programs, sport matches, and image content (movie). It is connected to the network 12, so that it receives the configuration table metadata through the network 12 from the planning terminal device 11 mentioned above. Then, it displays the thus acquired configuration table metadata on a prescribed display unit so that the cameraman (and other crew members) knows what to shoot. The cameraman operates the imaging device 14 to shoot scenes constituting video programs according to the producer's instruction given by the configuration table metadata. The video and audio data obtained by shooting are recorded on a recording medium such as the optical disk 17.

The imaging device 14 can record on the optical disk 17 not only original video data obtained by shooting but also low-resolution video data. The original video data is a large mass of data representing high-quality images, and hence it is used for the completed video program. On the other hand, the low-resolution video data represents images with a reduced number of pixels, because it is formed by thinning pixels from each frame of the original video data. The low-resolution data may be encoded according to the MPEG4 system. It is poorer in quality than the original video data; however, it is used mainly for rough editing on account of its small data size and its light load for transmission and reproduction.

The optical disk 17 recording the video and audio data from the imaging device 14 is subsequently transported to the editing section and the field PC 15 (mentioned later) for their use. Transportation of the optical disk 17, which inevitably takes a certain amount of time, may be replaced by transmission, such that the imaging device 14 supplies the video content to the planning terminal device 11, the field PC 15, or the editing terminal device 16 through the network 12. In this case, it is desirable that the imaging device 14 supply the low-resolution data (limited in data size) corresponding to the video data obtained by shooting, instead of supplying the original data itself, in order to reduce time (or load) required for transmission.

Incidentally, transmission of low-resolution data from the imaging device 14 can be carried out at any time. That is, it may be carried out simultaneously with shooting or batch-wise after shooting.

The advantage of transmitting the low-resolution data before transportation of the optical disk 17 is that the editing section can begin the editing work in a comparatively early stage (simultaneously with shooting) before the arrival of the optical disk 17. This improves the efficiency of the video program production. Incidentally, in the case where the low-resolution data is transmitted through the network 12 as mentioned above, the imaging device 14 may record only the original video and audio data on the optical disk 17 (with the low-resolution data omitted).

Incidentally, the above-mentioned optical disk 17 is not the only recording medium on which the imaging device 14 records the video content etc. Any other recording media may be acceptable. They include MD (Mini-Disc)®, MO (Magneto Optical Disk), magnetic disk (including flexible disk), magnetic tape (including DV [Digital Video] and VHS [Video Home System]), and semiconductor memory (including flush memory).

The field PC 15 is made up of a notebook personal computer, a portable information processing device (such as PDA), and their peripheral devices. It is connected to the imaging device 14 through wire or wireless circuits, so that it possesses the configuration table metadata and video content jointly with the imaging device 14.

The field PC 15 acquires the configuration table metadata from the planning terminal device 10 or from the imaging device 14 through the network 12. Then, it displays the configuration table metadata thus acquired on a prescribed display unit so that the person in charge of data collection knows what to shoot.

In addition, the field PC 51 generates information about data collection and shooting according to input from the user (or the person in charge of data collection) and adds the information to the appropriate column in the configuration table metadata. This information is text data describing the scene for each take from various points of view, and this text data is useful in the later stage of editing. Thus, the field PC 15 edits the configuration table metadata by writing the information about shooting situation. In addition, the field PC 15 supplies the information as metadata to the imaging device 14, so that it is added to the video and audio data collected by the imaging device 14.

The editing terminal device 16 is made up of an information processing device (such as personal computer) and its peripheral devices. It is installed in the editing section which carries out the editing of video content. The editing section edits the video and audio data collected by the imaging device 14 and completes the video program according to the instructions and scenarios prepared by the planning section and the configuration table metadata reflecting the state of data collection by the data collecting section.

The editing terminal device 16 acquires the configuration table metadata and low-resolution data from the imaging device 14 through the network 12. It also acquires original video and audio data from the optical disk 17 in which video and audio data are recorded by the imaging device 14. It may also acquire instructions for production (or editing) directly from the planning terminal device 11 or the field PC 15 through the network 12.

The editing terminal device 16 reproduces and displays the acquired video content data according to the configuration table metadata which has been acquired as mentioned above. For example, it displays the low-resolution data (which has been manipulated by the user and acquired through the network 12) or the original video and audio data recorded in the optical disk 17, sequentially in the order specified by the scenario, or it displays only the video data of desired clips. Incidentally, when reproducing the original video data recorded in the optical disk 17, the editing terminal device 16 utilizes the disk drive which is a device to read data recorded in the optical disk 17 or write data in the optical disk 17.

The editing terminal device 16 reproduces and displays necessary video data in an adequate order according to the configuration table metadata. It also edits the video data obtained by data collection. The editing includes rough editing and final editing.

Rough editing is simple editing for video and audio data. For rough editing, the editing terminal device 16 acquires several pieces of clip data. A piece of clip data corresponds to a clip as the unit for one shooting and relates to the video content containing video and audio data. Then it selects clip data for final editing from the acquired clip data, and it further selects (log) the necessary part of video. It sets up the editing start point (In point) and the editing end point (Out point) corresponding to the selected part of video by utilizing the time code and then extracts (ingests) the corresponding part from the clip data mentioned above.

Incidentally, the clip is a unit that indicates not only one shooting but also the length of time from the start of shooting to the end of shooting. It is a unit that indicates the length and amount of various data obtained by shooting. It sometimes denotes an aggregate of various data.

Final editing is a process of joining together the clip data which has undergone rough editing, performing final image quality adjustment on the resulting video data, and finishing the complete package data as the data ready for broadcasting.

More than one set may be used for the planning terminal device 11, imaging device 14, field PC 15, and editing terminal device 16. Thus the following arrangement may be possible. More than one set of the imaging device 14 acquire video data and one set of the editing terminal device 16 acquires the resulting video data for editing through the optical disk 17 and the network 12. Alternatively, one set of the imaging device 14 supplies video data for editing to more than one set of the editing terminal device 16.

The system mentioned above consists separately of the planning terminal device 11, the imaging device 14, the field PC 1, and the editing terminal device 16. However, the system may be constructed such that the functions of these components are combined together partly or entirely.

The assistance system for video program production may have a center server (not shown) connected to the network 12 in addition to the planning terminal device 11, the imaging device 14, the field PC 15, and the editing terminal device 16, so that it constitutes a client/server system, in which the above-mentioned components function as clients.

Figure 2:
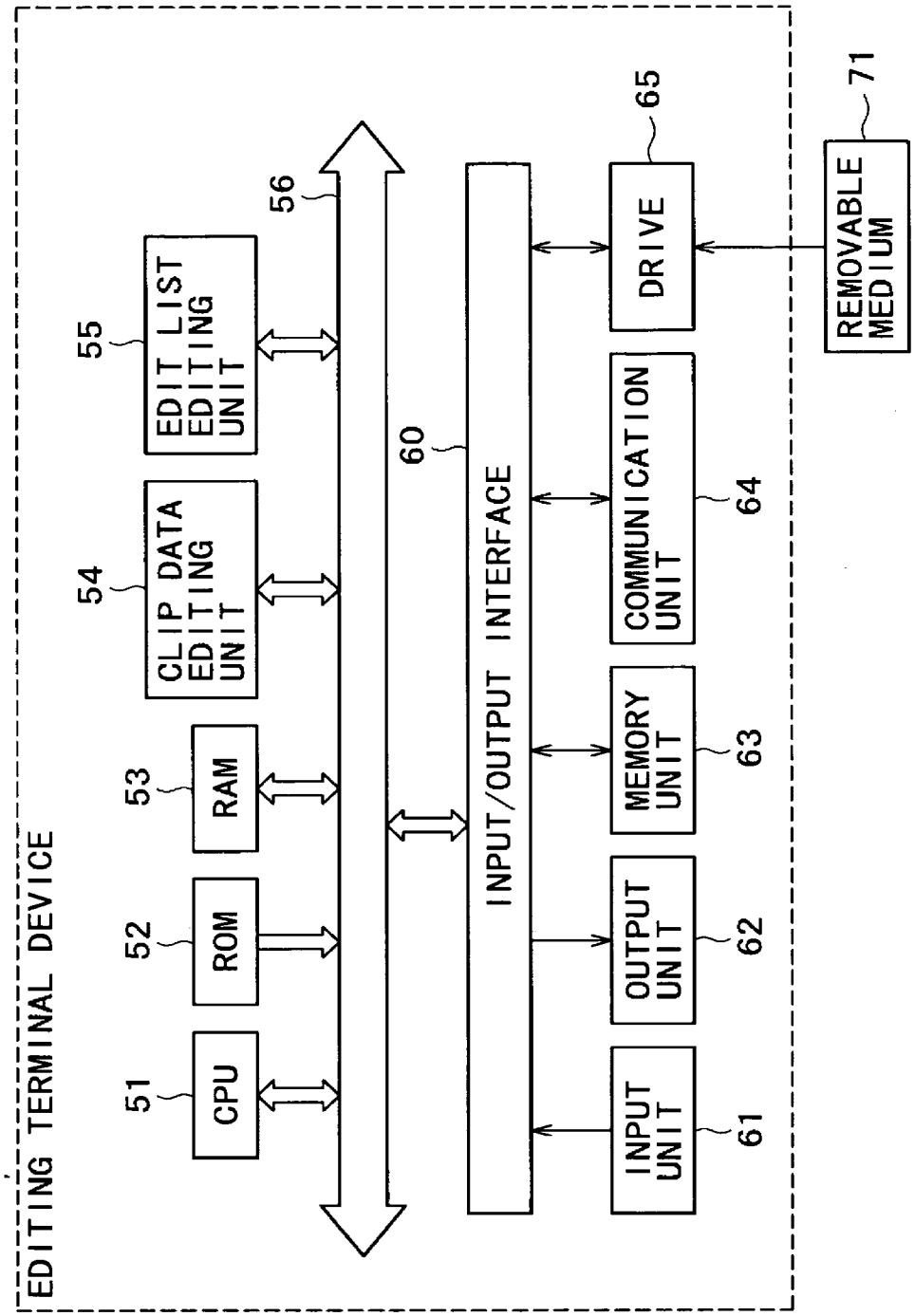
FIG. 2 is a block diagram showing the internal structure of the editing terminal device shown in FIG. 1.

FIG. 2 is a diagram showing the structure of the editing terminal device shown in FIG. 1. In FIG. 2, there is shown the CPU (Central Processing Unit) 51 of the editing terminal device 16. It carries out a series of processing according to the program stored in the ROM (Read Only Memory) 52. There is also shown the RAM (Random Access Memory) 53, which stores data and programs necessary for the CPU 51 to execute a series of processing.

The clip data editing unit 54 controls the output unit 62 so as to make the display device display the GUI (Graphical User Interface). It receives input from the user through the input unit 61. In answer to the input, it edits the video and audio data, low-resolution data, and metadata, which are recorded in the optical disk 17 mounted on the drive 65, or it edits the low-resolution data acquired through the communication unit 64. Thus, it generates information about editing and information about data after editing, and it supplies the resulting information to the edit list editing unit 55. Incidentally, the clip data editing unit 54 performs non-destructive editing without updating the data of various kinds to be edited.

The edit list editing unit 55 generates the edit list (which is information about the result of editing) according to information of various kinds which has been generated by editing in the clip data editing unit 54. The resulting edit list is stored in the memory unit 63. At this time, the edit list editing unit 55 generates the clip metadata for the edit list according to the clip metadata of the clips to be edited, which do not need to be in real time, as mentioned later. For example, the edit list editing unit 55 generates the discontinuous point of the LTC corresponding to the video data of the clip to be edited and also generates the conversion table for the frame number, and it records them as the clip metadata for the edit list.

The bus 56 connects the CPU 51, the ROM 52, the RAM 53, the clip data editing unit 54, and the edit list editing unit 55 to one another. It also connects them to the input/output interface 60.

The input/output interface 60 has the input unit 61 connected thereto. The input unit 61 is made up of a keyboard and a mouse. It receives input signals and sends them to the CPU 51. The input/output interface 60 also has the output unit 62 connected thereto. The output unit 62 is made up of a display and a speaker.

In addition, the input/output interface 60 has the memory unit 63 and the communication unit 64 connected thereto. The memory unit 63 is made up of a hard disk and an EPROM (Electrically Erasable and Programmable Read Only Memory). The communication unit 64 is designed for communication with other units through the network 12. The drive 65 reads and writes data from and to the removable medium 71, which is a recording medium such as magnetic disk, optical disk, magneto-optical disk, and semiconductor memory.

The editing terminal device 16 edits data recorded in the optical disk 17. The following is concerned with the optical disk 17 and the structure of the data stored therein.

The optical disk 17 is one which is capable of storing a large amount of data (say, 27 gibabytes) at a recording density with a minimum mark length of 0.14 μm and a track pitch of 0.32 μm. It permits data recording and reading by means of blue-violet laser (having a wavelength of 405 nm and a numerical aperture (NA) of 0.85). Incidentally, it may be replaced by any other recording medium, such as DVD-RAM (Digital Versatile Disc-Random Access Memory), DVD-R (DVD-Recordable), DVD-RW (DVD-ReWritable), DVD+R (DVD+Recordable), DVD+RW (DVD+ReWritable), CD-R (Compact Disc-Recordable), and CD-RW (CD-ReWritable).

As mentioned above, a series of clip data (consisting of video and audio data) are recorded in the optical disk 17 (as a recording medium) by the imaging device 14. The arrangement of the clip data is shown in FIG. 3A.

Figure 3:
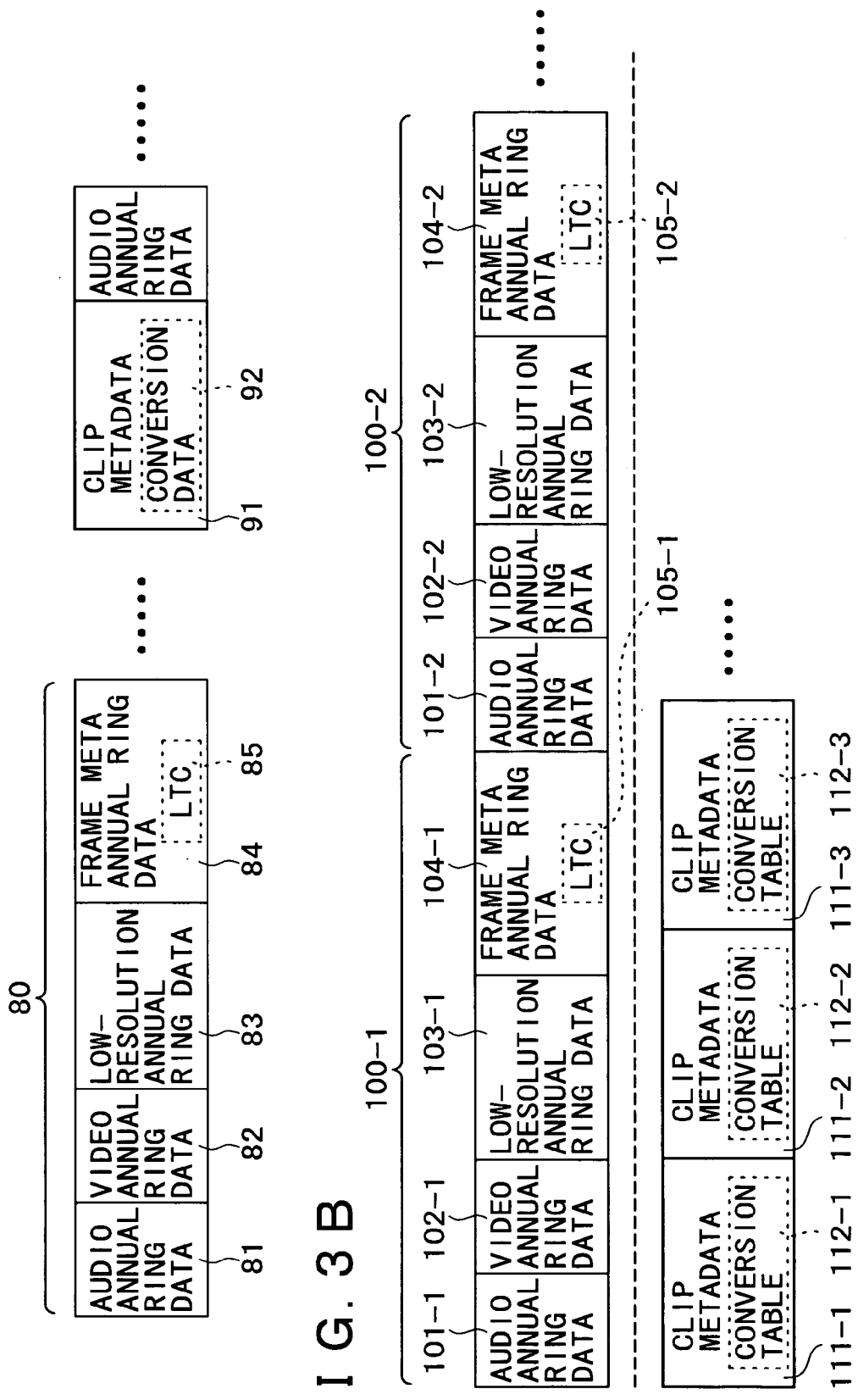
FIG. 3A is a schematic diagram showing an example of the structure of the data recorded in the optical disk shown in FIG. 1.
FIG. 3B is a schematic diagram showing an example of the structure of the data recorded in the optical disk shown in FIG. 1.

FIG. 3A shows how the annual ring data 80 is arranged in the optical disk 17. The annual ring data 80 is composed of the audio annual ring data 81, the video annual ring data 82, the low-resolution annual ring data 83, and the frame meta annual ring data 84, corresponding to a prescribed period of time (say, 2 seconds), which are obtained by the imaging device 14. The annual ring data 80 extends over one clip continuously. The end of the annual ring data 80 is followed by the clip metadata 91 corresponding to the clip and also by the annual ring data and clip metadata corresponding to other succeeding clips.

The audio annual ring data 81 and the video annual ring data 82 have the same length of reproducing time, and they correspond to each other. In other words, the audio annual ring data 81 is the audio data corresponding to the dynamic image which is a reproduction of the video annual ring data 82. Also, the low-resolution annual ring data 83 is the data corresponding to the video annual ring data 82, and it has the same length of reproducing time as the video annual ring data 82. In other words, the low-resolution annual ring data 83 corresponds to a dynamic image of reduced size which has been reproduced from the video annual ring data 82. The frame meta annual ring data 84 is composed of metadata added to each frame (video data of one image) of the dynamic image corresponding to the video annual ring data 82. (This metadata will be referred to as frame metadata hereinafter.) In other words, the frame meta annual ring data is composed of a series of frame data corresponding to all the frames of the video annual ring data 82.

Incidentally, the frame data is one which corresponds to the added frame and needs to be in real time when video signals are reproduced. In other words, the frame data includes LTC (Linear Time Code) characterized by prescribed temporal information, such as date and hour (year, month, day, hour, minute, second), UB (User Bit) which represents the characteristics of the video signal corresponding to the frame, UMID (Unique Material Identifier), GPS (Global Positioning System) information representing the position where shooting with the video camera has been carried out, essence mark which is information about the content of the essence data such as video signals and audio signals, ARIB (Association of Radio Industries and Business) metadata, and information about the setting and control of the video camera which has been used for shooting. Incidentally, the ARIB metadata is metadata to be superposed on the standard communication interface such as SDI (Serial Digital Interface). The video camera setting/control information includes the IRIS control value, white balance/black balance mode, and lens information (such as lens zooming and lens focusing).

Consequently, the frame meta annual ring data 84 contains LTC 85 as the temporal information of the frame which uses time independent of real time which is based on a certain time. The LTC 85 is an aggregate of LTCs added to individual frames. It includes LTCs corresponding to all the frames of the video annual ring data 82 contained in the same annual ring data 80. It is reproduced together with the audio annual ring data 81 and the video annual ring data 82 at the time of reproduction.

The optical disk 17 has data recorded spirally or concentrically in the direction from the inner circumference to the outer circumference. It follows, therefore, that the audio data 81 and the video data 82 corresponding to the identical reproducing time are recorded in the optical disk 17 sequentially in the order of shooting. The annual ring data 80 composed of the low-resolution data 83 and the frame metadata 84 corresponding to them is also recorded in the same way as above. Consequently, mutually corresponding data aggregates are recorded (arranged) at positions physically close to each other in the optical disk 17. In this way the optical disk 17 reduces seek time at the time of data reproduction (or data reading) and hence reduces time and load for processing.

The annual ring data 80 recording one clip is followed by the clip metadata 91.

The clip metadata 91 is data corresponding to added clips as a whole. It is data which does not need to be in real time when video signals are reproduced. In other words, examples of the clip metadata include the conversion table 92 that makes the LTCs corresponding to frames correspond to the frame number. They also include UMID, GPS information, and other information. The clip metadata 91 is data which is used when the audio data and video data are edited or retrieved. It is usually composed of those kinds of data which are not required when the video data etc. are reproduced.

The frame metadata and clip metadata may contain other data than mentioned above. The frame metadata and clip metadata may also contain data of the same content. The frame metadata may be the clip metadata. Conversely, the clip metadata may be the frame metadata. For example, the essence mark, ARIB metadata, or video camera setting/control information may be the clip data; alternatively, it may contain both of the frame data and the clip metadata. Further, UMID and GPS information may be contained in the frame metadata, or both of the frame data and clip data may be contained in the frame metadata.

Also, in FIG. 3A, the conversion table 92 contained in the clip metadata 91 is a table corresponding to LTC contained in the annual ring data recorded immediately before the first annual ring data or the annual ring data recorded next to the clip metadata recorded preceding by one. It follows, therefore, that the conversion table 92 is recorded in the somewhat neighborhood (compared with that shown in FIG. 3B mentioned later) of the audio annual ring data 81 (to which the conversion table 92 corresponds) and the video annual ring data 82. The metadata contained in the clip metadata 91 is basically metadata which does not need to be in real time. However, in the case where the user instructs the reproduction of a specific frame by using the conversion table 92, it is desirable that the audio annual ring data 81 and video annual ring data 82 to be reproduced be recorded in the vicinity of the conversion table 92, because in this way it is possible to reduce the seek time and increase the reading speed of the audio annual ring data 81 and the video annual ring data 82.

Incidentally, the clip metadata may be recorded in the region separate from the region in which the annual ring data is stored, as shown in FIG. 3B. In the case shown in FIG. 3B, the clip metadata 111-1, 111-2, 111-3, . . . are recorded all together in the region separate from the region in which the annual ring data is stored. The annual ring data 100-1 is composed of audio annual ring data 101-1, video annual ring data 102-1, low-resolution annual ring data 103-1, and frame meta annual ring data 104-1. The annual ring data 100-2 is composed of audio annual ring data 101-2, video annual ring data 102-2, low-resolution annual ring data 103-2, and frame meta annual ring data 104-2.

The clip metadata 111-1 to 111-3 each contain any of the conversion tables 92-1 to 92-3. In these conversion tables 112-1 to 112-3 are registered the start point, change point, and end point (or the frame whose LTC value is discontinuous with the immediately preceding or following frame) of the LTC contained in the corresponding frame meta annual ring data. The conversion tables 112-1 to 112-3 may be designed such that the LTCs are registered at certain intervals. The conversion table makes it possible to reduce time required to calculate the frame number required at the time of frame retrieval as the number of registered LTCs increases. In this case, however, the conversion table increases in data size and takes a longer time for entire retrieval. Therefore, it is desirable to select LTCs for the conversion table so that the conversion table has an adequate size.

In this case, the clip metadata is recorded in a region separate from the annual ring data after the completion of the audio data recording task, video data recording task, low-resolution data recording task, and frame metadata recording task.

The conversion tables 112-1 to 112-3 contained in the clip metadata 111-1 to 111-3 are recorded in regions close to each other. Thus, in the case where a specific frame is searched by using more than one conversion table, it is possible to reduce the seek time and to retrieve the desired frame speedily.

Also, in the case where audio data and video data are reproduced, there is no unnecessary clip metadata for reproduction between them, and this makes it possible to reduce the reading time and speed up the reproducing process.

In addition, the clip metadata is composed of metadata which does not need to be in real time, and hence it does not make it necessary to take the seek time into consideration. It may be arranged at any physical position in the memory region of the optical disk 17. For example, it is possible to record one clip metadata at more than one position separately.

As mentioned above, LTC is recorded as frame metadata together with the essence data composed of audio data and video data, and the conversion table (which is composed of the start point, change point, and end point of LTC) is recorded as the clip metadata. Therefore, the user can edit easily the data recorded in the optical disk 17 based on LTC, and the user can also retrieve and reproduce the desired frame by means of LTC.

The following is about the file system to control data recorded in the optical disk 17, the directory structure in the file system, and the file.

Any file system may be used to control data recorded in the optical disk 17. Some examples are UDF (Universal Disk Format) and ISO9660 (International Organization for Standardization 9660). Other examples are FAT (File Allocation Tables), NTFS (New Technology File System), HFS (Hierarchical File System), and UFS (Unix® File System), which are used in the case where a magnetic disk (such as hard disk) is used in place of the optical disk 17.

Figure 4:
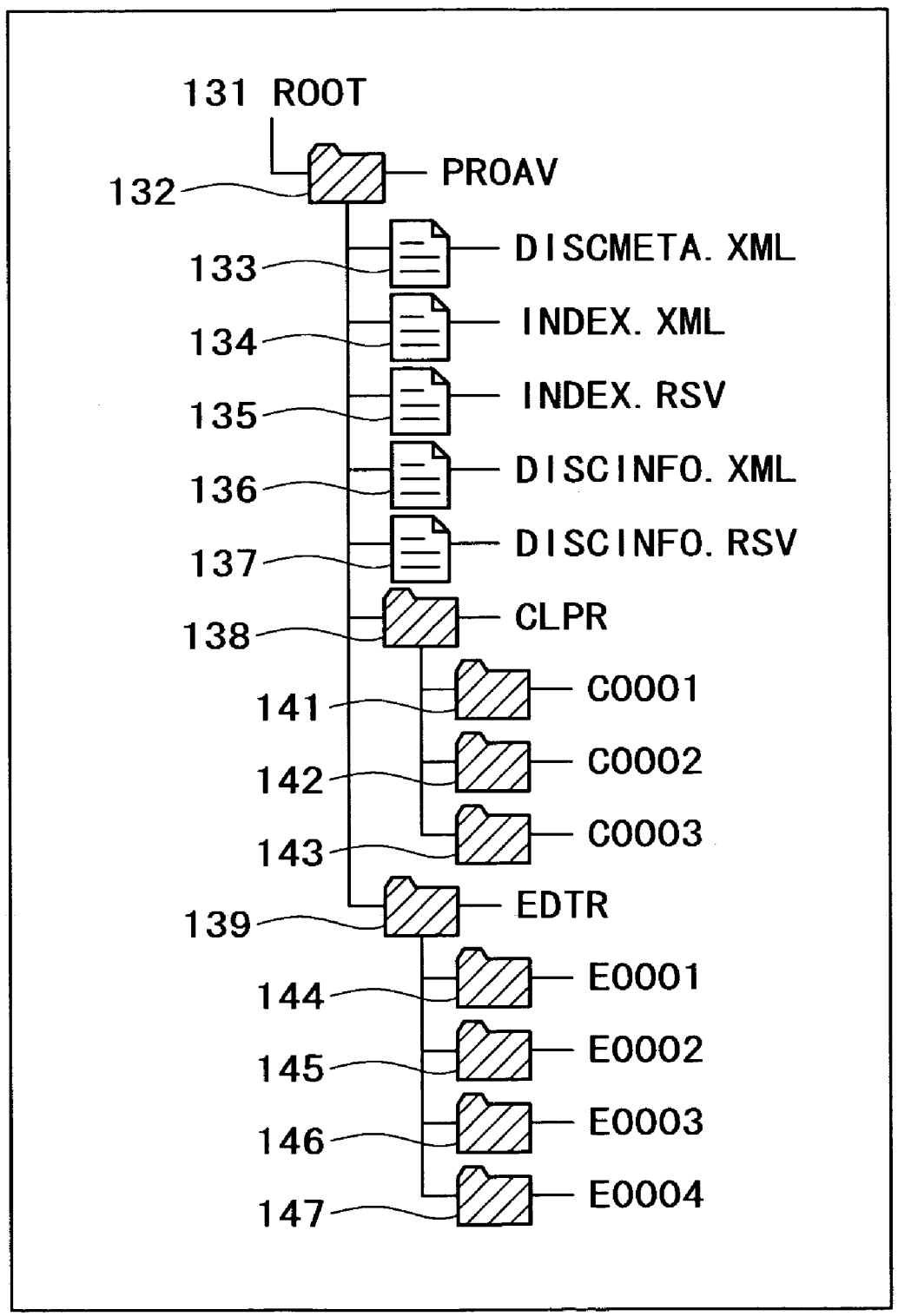
FIG. 4 is a diagram showing an example of the directory structure to control data by the file system.

According to this file system, the data recorded in the optical disk 17 is controlled by the directory structure and file shown in FIG. 4.

In FIG. 4, the root directory (ROOT) 131 has the lower PROAV directory 132, in which are arranged the information about the essence data such as video data and audio data and the edit list showing the result of editing of the essence data. Incidentally, the root directory 131 also has the configuration table data (not shown).

The PROAV directory 132 contains the disk metafile (DISCMETA.XML) 133, the index file (INDEX.XML) 134, and the index file (INDEX.RSV) 135. (DISCMETA.XML) 133 is a file that contains the title and comment of all the essence data recorded in the optical disk 17 and also contains information (such as path) of the video data corresponding to the typical image of the frame representing the all the video data recorded in the optical disk 17. (INDEX.XML) 134 contains information to control all the clips and edit lists recorded in the optical disk 17. (INDEX.RSV) 135 is a copy of (INDEX.XML) 134 which is prepared to improve reliability.

Moreover, the PROAV directory contains the disk information file (DISCINFO.XML) 136 and the disk information file (DISCINFO.RSV) 137. (DISCINFO.XML) 136 is a metafile for all the data recorded in the optical disk 17; e.g., it is a file that contains such information as disk attribute, playback start position, and Reclnhi. (DISCINFO.RSV) 137 is a copy of (DISKINFO.XML) 136 which is prepared to improve reliability. For information updating, it may be only necessary to update (DISKINFO.XML) 136.

The PROAV directory contains, in addition to the above-mentioned files, the clip root directory (CLPR) 138. which contains lower directories for clip data, and the edit list root directory (EDTR) 139, which contains lower directories for edit list data.

The clip root directory 138 contains directories for different clips so as to control the data of the clips recorded in the optical disk 17. For example, in the case of FIG. 4, it contains three directories—clip directory (C0001) 141, clip directory (C0002) 142, and clip directory (C0003) 143. In other words, each data of the first clip recorded in the optical disk 17 is controlled as a file in the directory subordinate to the clip directory 141; each data of the second clip recorded in the optical disk 17 is controlled as a file in the directory subordinate to the clip directory 142; and each data of the third clip recorded in the optical disk 17 is controlled as a file in the directory subordinate to the clip directory 143.

The edit list root directory 139 has different directories each containing the edit list recorded in the optical disk 17. For example, in the case shown in FIG. 4, it has four directories—edit list directory (E0001) 144, edit list directory (E0002) 145, edit list directory (E0003) 146, and edit list directory (E0004) 147, for four edit lists. In other words, the edit list showing the result of the first editing of the clip recorded in the optical disk 17 is controlled as a file in the directory subordinate to the edit list directory 144, the edit list showing the result of the second editing is controlled as a file in the directory subordinate to the edit list directory 145, the edit list showing the result of the third editing is controlled as a file in the directory subordinate to the edit list directory 146, and the edit list showing the result of the fourth editing is controlled as a file in the directory subordinate to the edit list directory 147.

The directory subordinate to the clip directory 141, which is placed in the clip root directory 138 mentioned above, contains those files shown in FIG. 5 for data of the clip which is recorded first in the optical disk 17.

Figure 5:
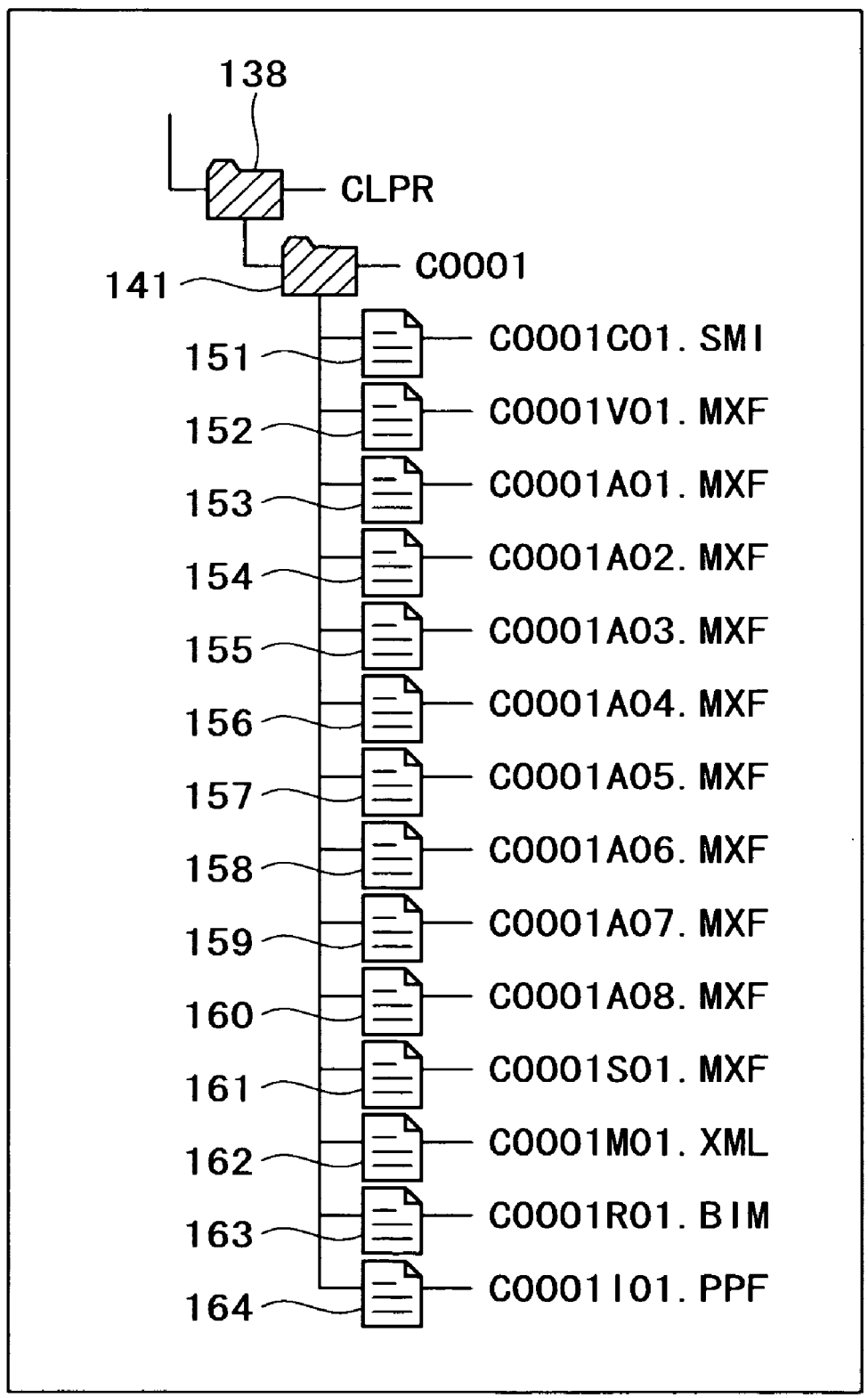
FIG. 5 is a detailed diagram showing the directory structure shown in FIG. 4.

In the case shown in FIG. 5, the clip directory 141 contains the following files.

Clip information file (C0001C01.SMI) 151, which controls the clip.

Video data file (C0001V01.MXF) 152, which contains the video data of the clip.

Eight audio data files (C0001A01.MXF) 153 to (C0004A08.MXF) 160, which contain the audio data of each channel of the clip.

Low-resolution data file (C0001S01.MXF) 161, which contains the low-resolution data corresponding to the video data of the clip.

Clip metadata file (C0001M01.XML) 162, which contains the clip metadata which does not need to be in real time (such as the conversion table which associates LTC with the frame number).

Frame metadata file (C0001R01.BIM) 163, which contains the frame metadata, which needs to be in real time, such as LTC corresponding to the essence data of the clip.

Picture pointer file (C0001I01.PPF) 164, which describes the frame structure of the video data file 152. (The frame structure is information about the compression format of each picture for MPEG or information about the offset address from the file head.)

In the case shown in FIG. 5, the video data, low-resolution data, and frame metadata (which need to be in real time at the time of playback) are each controlled as a single file, so as to save reading time.

There are eight channels for audio data (which needs to be in real time at the time of playback), so as to meet requirements for multi-channel voices, such as 7.1 channel. They are controlled as separate files. In other words, the audio data is controlled as eight files. However, this is merely exemplary, and there may be less or more than eight files corresponding to the audio data.

Similarly, in some cases, it is also possible to control each of the video data, low-resolution data, and frame metadata as two or more files.

Also, in FIG. 5, the clip metadata which does not need to be in real time is controlled as a file different from the frame metadata which needs to be in real time. The purpose of this is to prevent unnecessary metadata from being read during ordinary playback of video data. In this way it is possible to reduce time and load for playback.

Incidentally, the clip metadata film 162 is usually written in the XML format (extensible Markup Language) for its versatility. However, the frame metadata file 163 is of BIM format which is prepared by compiling a file of XML format so as to reduce time and load for playback.

The clip directory 141 shown in FIG. 5 has the file structure that can be applied to all of other clip directories corresponding to each clip recorded in the optical disk 17. In other words, the file structure shown in FIG. 4 is also applicable to the clip directories 142 and 143; therefore, their description is omitted.

The foregoing is concerned with each file contained in the clip directory corresponding to one clip. The file structure is not limited to the one mentioned above. Any file structure may be acceptable so long as there exists a clip metadata file corresponding to the clip in the directory subordinate to each clip directory.

The following is about the file structure in the directory subordinate to the edit list root directory 139 shown in FIG. 4. As mentioned above, the edit list root directory 139 has the edit list directory 145 subordinate thereto. The edit list directory 145 contains and controls files (as shown in FIG. 6) of the edit list data which is information about the result of the second editing of data of the clip recorded in the optical disk 17.

Figure 6:
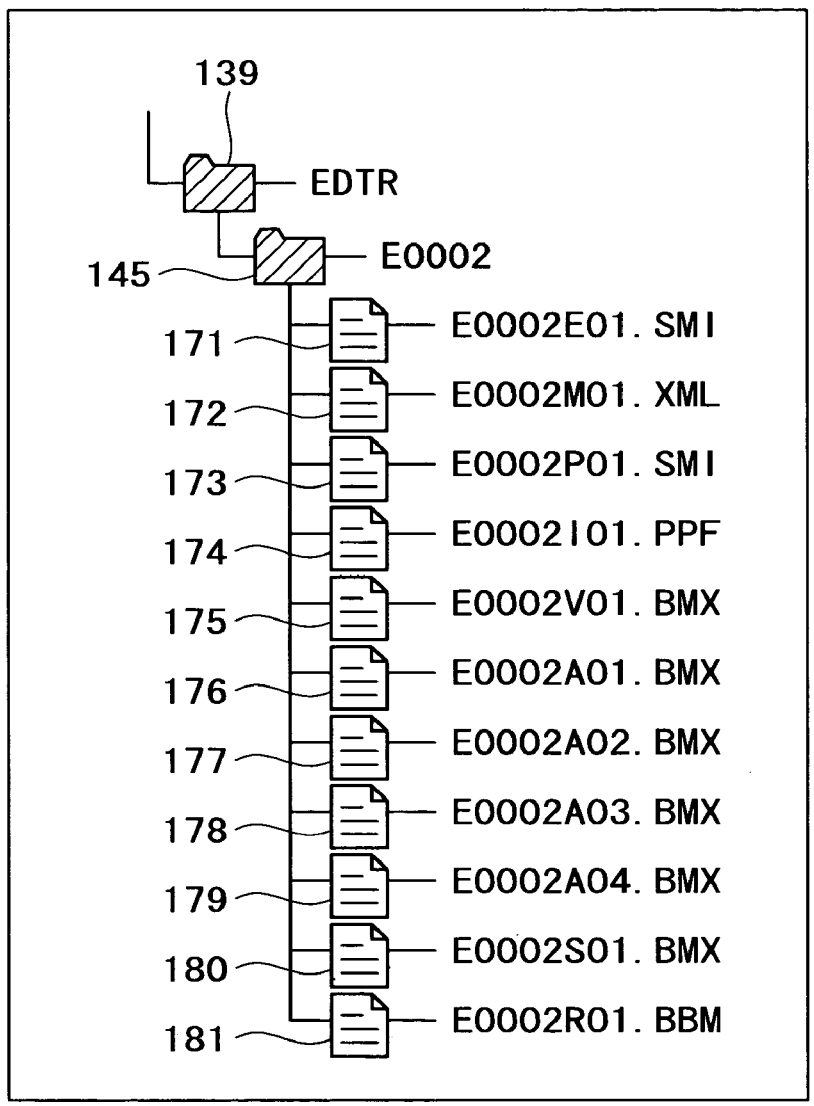
FIG. 6 is a detailed diagram showing the directory structure shown in FIG. 4.

In the case shown in FIG. 6, the edit list directory 145 contains the following files.

Edit list file (E0002E01.SMI) 171, which controls the result of editing (edit list).

Clip metadata file (E0002M01.XML) 172 for edit list, which contains the clip metadata corresponding to the essence data after editing (that part which has been extracted as data after editing from the essence data of all the clips used for editing), or which contains the clip metadata newly generated according to said clip metadata.

Play list film (E0002P01.SM1) 173, which contains information such as playback procedure (play list) of the essence data which is based on the result of editing (edit list).

Picture pointer file (E0001I01.PPF) 174 for play list, which describes the frame structure of the video data to be reproduced according to the playback procedure contained in the play list file 173 (e.g., information about the compression format for each picture in MPEG or information about offset address from the head of the file).

Video data file (E0002V01,BMX) 175 for play list, which contains the video data to guarantee the real time playback according to the playback procedure (play list) of the play list file 173.

Four data files (E0002A01.BMX to E0002A04.BMX) 176 to 179 for play list, which contain the audio data to guarantee the real time playback according to the playback procedure (play list) of the play list file 173.

Low-resolution data file (E0002S01.BMX) 180 for play list, which contains low-resolution data to guarantee the real time playback according to the playback procedure (play list) of the play list file 173.

Frame metadata file (E0002R01.BBM) 181 for play list, which contains the frame metadata to guarantee the real time playback according to the playback procedure (play list) of the play list file 173.

In FIG. 6, those files which do not need to be in real time are controlled as files different from the frame metadata which needs to be in real time. The purpose of this is to prevent unnecessary metadata from being read during ordinary playback of video data (or during reproduction of the results of editing) by means of the layback procedure (play list). In this way it is possible to reduce time and load for playback.

As will be mentioned later, the clip metadata file 172 for edit list contains the clip metadata which has been newly generated according to the clip metadata (the clip metadata file existing in the directory subordinate to the clip root directory 138) of the clip used for editing according to the results of editing. For example, when editing is carried out, the part corresponding to the essence data after editing is extracted from the clip metadata contained in the clip metadata film 162 shown in FIG. 5, and it is used to reconstruct new clip metadata in which the essence data after editing is one clip and it is controlled as the clip metadata file for edit list. In other words, to the essence data after editing is added new clip metadata in which the essence data after editing is one clip, and the clip metadata is controlled as one clip metadata file for edit list. Thus, this clip metadata file for edit list is generated each time editing is carried out.

Incidentally, this clip metadata film 172 for edit list is written in the XML format for its versatility.

The video data contained in the video data file 175 for play list, the audio data contained in the audio data files 176 to 179 for play list, the low-resolution data contained in the low-resolution data file 180 for play list, and the frame data contained in the frame metadata file 181 for play list are those which are extracted respectively from the video data, audio data, low-resolution data, and frame metadata corresponding to the clip controlled in the directory subordinate to the clip root directory 138 shown in FIG. 5, and such data corresponds to the results of editing. Such data is read when playback process is carried out according to the playback procedure (play list) contained in the play list file 173. The purpose of preparing such data corresponding to the results of editing is to reduce time and load for playback.

The foregoing may be modified in some cases such that the video data, low-resolution data, and frame metadata are controlled respectively as a plurality of files. Likewise, the number of files corresponding to the audio data may be less or more than 4.

Incidentally, the frame metadata file 181 for play list is a file of the BBM format that corresponds to the BIM format formed by compiling a file of the XML format so as to reduce time and load for playback.

The file structure of the edit list directory 145 shown in FIG. 6 is applicable to all the edit lists (results of editing). In other words, the file structure shown in FIG. 6 is applicable to the other edit list directories 144, 146, and 147, and, therefore, its description is omitted.

The foregoing is about the files contained in the edit list directory corresponding to each editing work. However, the file structure is not limited to the one mentioned above. Any file structure is acceptable so long as there exists the clip metadata file for edit list corresponding to the editing in the directory subordinate to each edit list directory.

Figure 7:
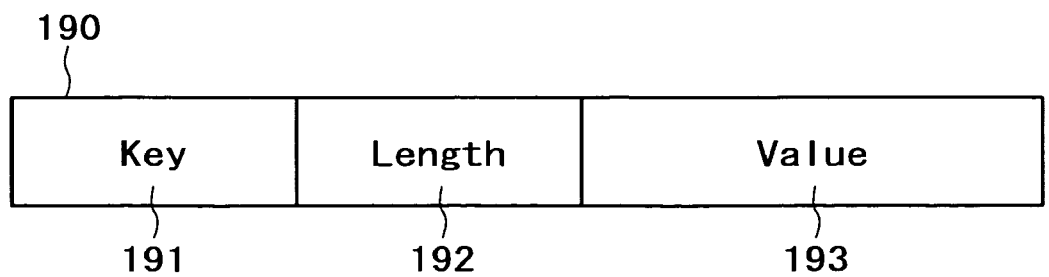
FIG. 7 is a schematic diagram showing the structure of the data encoded by KLV.

The following is about the data contained in the clip metadata. As mentioned above, the clip metadata contains LTC and the conversion table for frame number as well as UMID, information about GPS, and other information. Such information is the standardized one which might be stored in the frame metadata, and it might need to be in real time. Therefore, it is KLV-encoded data (referred to as KLV data hereinafter) composed of key data (Key) 191, length data (Length) 192, and value data (Value) 193, as shown in FIG. 7, so as to guarantee synchronized communication through the standard interface such as SDI (Serial Digital Interface). This format conforms to SMPTE 335M/RP214.

The key data 191 of the KLV data 190 is an identifier that indicates the KLV-encoded data item. This identifier is the one which corresponds to various data items defined in the metadata dictionary of SMTPE. The length data 192 of the KLV data 190 is data indicating the length of the value data 193 in terms of byte. The value data 193 of the KLV data 190 is data composed of data per se such as text data like XML (eXtensible Markup Language) documents. In other words, the KLV data 190 is the data of data items shown in the key data 191, the data of data length shown in the length data 192, and one which is obtained by encoding the data shown in the length data 192.

As mentioned above, in actual, the conversion table and UMID are also one of the KLV data; however, in the following, the term KLV data is used to denote the conversion table contained in the clip metadata and metadata (KLV data) other than UMID, in order to simplify description.

Incidentally, the above-mentioned encoding method is merely exemplary, and information contained in the clip metadata may or may not be encoded by any other method than the KLV-encoding method.

As mentioned above, the editing terminal device 16 shown in FIG. 1 performs editing on the essence data recorded in the optical disk 17 (or the essence data supplied through the network 12). In this case, the editing terminal device 16 leaves untouched the essence data of the clip for editing and generates the edit list as information about the results of editing.

In this way the editing terminal device 16 can perform non-destructive editing while leaving the data of the clip as an object of editing. Therefore, the editing terminal device 16 can repeat editing easily as many times as necessary while preventing the image quality from being degraded by editing.

Also, the editing terminal device 16 generates and stores the clip metadata for edit list corresponding to the edit list (results of editing) which has been generated at the time of editing. In this way the editing terminal device 16 can perform non-destructive editing while leaving untouched the clip metadata which is an object of editing at the time of editing. Also, in the case where the user utilizes the clip metadata about the results of the editing that synthesizes a plurality of clips, the editing terminal device 16 simply reads the clip metadata file for one edit list without reading a plurality of clip metadata files corresponding to unedited clips. This helps reduce time and load for editing.

Moreover, when the editing terminal device 16 generates the clip metadata for edit list, it adds a new LTC (in which the result of editing is one clip) is added to the video data of the results of editing, as mentioned later. In other words, the editing terminal device 16 edits not only the video and audio data but also the LTC corresponding to the video data. In this way, the editing terminal device 16 synthesizes a plurality of clips, thereby preventing the value of LTC from fluctuating in a complicated manner.

In this case, the foregoing may be modified such that the editing terminal device 16 does not utilize the LTC contained in the frame metadata (or does not read the frame metadata) but utilizes the LTC and the corresponding table for the frame number contained in the clip metadata for edit list (or reads the clip metadata for edit list), thereby calculating LTC, and reproduces the essence data according to the play list and reproduces the results of editing.

Incidentally, when generating the clip metadata for edit list, the editing terminal device 16 may select whether to utilize the LTC contained in the clip before editing or prepare a new LTC, as mentioned later.

The following is about the processing to generate the clip metadata for edit list (or reconstruct the clip metadata).

In editing by the editing terminal device 16 shown in FIG. 2, the clip data editing unit 54 performs non-destructive editing on the video and audio data recorded in the optical disk 17 mounted on the drive 65 or on the low-resolution data acquired through the communication unit 64, according to the user's instruction entered through the input unit 61, thereby generating information about the content of editing or information about data after editing.

The edit list editing unit 55 acquires through the bus 56 the information of various kinds which is generated as the clip data editing unit 54 performed editing. It also generates the edit list (data of various kinds contained in the edit list) according to the results of editing. Then it records the thus generated information in the memory unit 63 or the optical disk 17 mounted on the drive 65.

When generating the edit list, the edit list editing unit 55 processes the clip metadata for edit list and generates the clip metadata for edit list (in which the essence data after editing is one clip) by using the clip metadata of the clip which is the object of editing.

A description is made below (with reference to the flow-chart shown in FIG. 8) of the processing of the clip metadata for edit list by the edit list editing unit 55.

The edit list editing unit 55 starts the processing of the clip metadata for edit list. In the first step S1, it extracts information about the change point of the UMID data and KLV data within a specified range, from the clip metadata of each clip for editing.

For example, UMID can allocate for the video data, within one clip from one frame, in terms of arbitrary time length. In other words, allocation can be made such that the value of UMID data changes in an arbitrary frame within the video data of one clip. Similarly, allocation can be made such that the value of KLV data containing information of various kinds changes in an arbitrary frame within the video data of one clip. The edit list editing unit 55 extracts the value of UMID data and KLV data which changes as mentioned above. It also extracts the frame number in the edited video data of the frame within the range corresponding to the results of editing out of the frame in which the values change.

After having extracted information about the change point of the UMID data and KLV data within a specified range, the edit list editing unit 55 proceeds to Step 2, in which it generates the UMID data and KLV data corresponding to the frame number after editing, of the frame as the change point, according to the data of the extracted point.

UMID is an identifier to specify only one material according to that information. Therefore, the edit list editing unit 55 newly generates UMID corresponding to the video data which is the result of editing, because it is prohibited to allocate UMID common to varied video data (so that a plurality of materials are specified by one UMID). Similarly, the edit list editing unit 55 newly generates KLV data also for the KLV data, if it is necessary to do so.

After generating the UMID data and KLV data corresponding to the frame number after editing, of the frame as the change point, the edit list editing unit 55 proceeds to Step S3, in which it supplies the UMID data and KLV data to the memory unit 63 and causes them to be stored therein, and registers them as the clip metadata for edit list.

After Step S3, the edit list editing unit 55 proceeds to Step S4, in which it edits LTC according to the user's instruction, generates the conversion table of LTC for edit list, and records the clip metadata for edit list. A detailed description of the LTC editing process will be made with reference to the flow-chart shown in FIGS. 9 and 10.

After having completed the LTC editing process, the edit list editing unit 55 completes the processing of the clip metadata for edit list.

Figure 8:
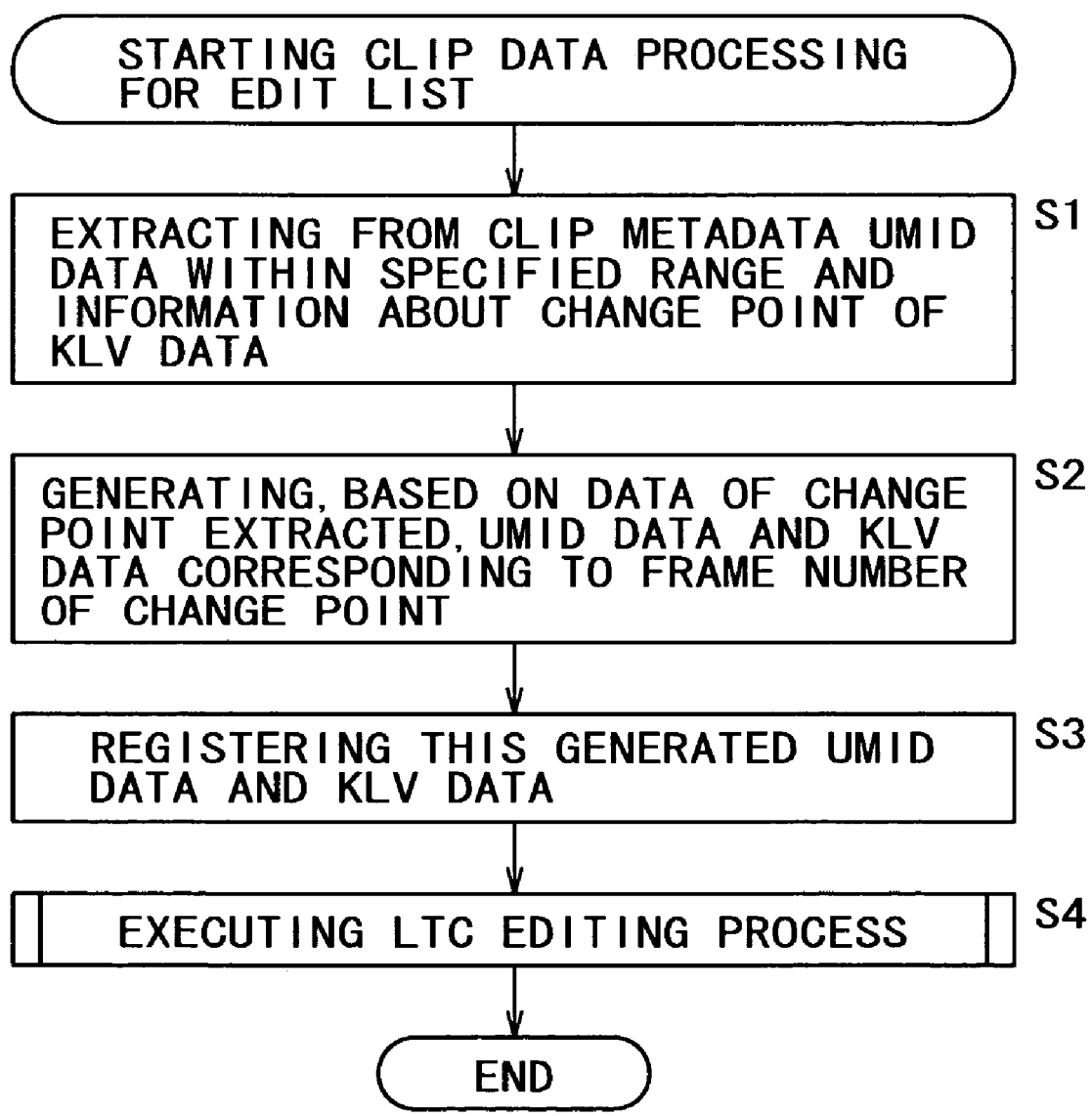
FIG. 8 is a flowchart illustrating how the editing unit shown in FIG. 2 processes the clip metadata for the edit list.

In Step S4 shown in FIG. 8, the edit list editing unit 55 carries out the LTC editing process. A detailed description of this process is given below with reference to FIGS. 9 and 10. For the purpose of simple description, it is assumed that the LTC added to the video and audio data of each clip for editing have continuous values in the clip and have no change point at which the clip value is discontinuous in the preceding and following frames.

After having started the LTC editing process, the edit list editing unit 55 proceeds to Step 21, in which it initializes the values of variables to be used in the processing (mentioned later) by substituting a value "0".

After having completed the initialization of variables, the edit list editing unit 55 proceeds to Step S22, in which it judges whether or not it should generate the conversion table which associates a unified new LTC with the video data after editing.

The edit list editing unit 55 controls the output unit 62, thereby causing the display to display GUI (Graphical User Interface), and also controls the input unit 61, thereby allowing the user to enter the condition for generation of the conversion table contained in the clip metadata for edit list. To be concrete, the edit list editing unit 55 allows the user to enter the condition that determines whether to generate the conversion table that associates the video data after editing with the unified new LTC.

The edit list editing unit 55 judges whether to generate the conversion table that associates the video data after editing with the unified new LTC, according to the user's input. If it judges that it should generate such a conversion table, then it proceeds to Step S23, in which it controls the input unit 61 and receives the entry of the initial value for LTC.

In the case where the unified new LTC is made to correspond to the video data after editing, the user may set up the initial value which is the value of LTC corresponding to the head frame. To set up the initial value, the user operates the input unit 61 for entry of the initial value.

The edit list editing unit 55 proceeds to Step S24, in which it controls the input unit 61 and judges whether or not the initial value has been entered according to the user's entry. If it judges that the initial value has been entered, it proceeds to Step S25, in which it substitutes the entered initial value for the variable LtcStart which denotes the initial value of LTC. Then it proceeds to Step S27.

Incidentally, if the edit list editing unit 55 judges in Step S24 that the initial value of LTC has not yet been entered, then it proceeds to Step S26, in which it substitutes a value "0" for the variable LtcStart and then proceeds to Step S27.

In Step S27, the edit list editing unit 55 substitutes the value of the variable LtcStart for the variable LtcNum which denotes the value of LTC to be registered in the conversion table. It further substitutes a value "0" for the variable FrameNum which denotes the frame number to be registered in the conversion table. It further associates the value of the variable LtcNum and the value of the variable FrameNum with each other and stores it in the memory unit 63. Thus, it registers them in the conversion table corresponding to the video table after editing, with these values being the start point.

In the case where the unified new LTC is made to correspond to the video data after editing, the value of LTC increases continuously and hence no discontinuity occurs in the frame except for the start point. Therefore, after the processing by the edit list editing unit 55 in Step S27, only the value of LTC at the start point and the frame number (or "0") at the start point are registered in the conversion table which adds the unified new LTC to the video data after editing.

To complete the process in Step S27, the edit list editing unit 55A registers the start point in the conversion table and completes the LTC editing process. Thus, the clip metadata processing for edit list shown in FIG. 8 comes to an end.

Incidentally, in the process in Step S22 shown in FIG. 9, the edit list editing unit 55 may judge not to generate the conversion table that adds the unified new LTC to the video data after editing. In this case, the edit list editing unit 55 proceeds to Step S31 shown in FIG. 10, in which it substitutes a value "0" for the variable ClipNum for selection of the clip as an object for processing.

In Step S32, the edit list editing unit 55 calculates the LTC of the start point within the specified range and the number of frames within the specified range, by referencing the conversion table for the LTC and the frame number which is contained in the clip metadata of the ClipNum$^{th}$ clip, and substitutes the calculated value for the variable ClipFrame and substitutes the LTC of the start point within the specified range for the variable LtcNum. In other words, the edit list editing unit 55 notes the video data of the ClipNum$^{th}$ clip out of the clips recorded in the optical disk 17, and calculates the number of frames in the part which is accepted as the editing results and substitutes the value for the variable ClipFrame. Also, the edit list editing unit 55 references the conversion table for the clip data and calculates the frame number in the video data as the editing results of the first frame of the part which is accepted as the editing result and substitutes the result of calculations for the variable LtcNum.

After completing the processing in Step S32, the edit list editing unit 55 proceeds to Step S33, in which it associates the variable LtcNum and the variable FrameNum with each other and records them in the memory unit 63. In this way, it registers these values in the conversion table corresponding to the video data after editing.

After registering in the conversion table the start point of LTC within the specified range, the edit list editing unit 55 proceeds to Step S34, in which it judges whether or not the clip for editing is the last clip. If it judges that there exists an unprocessed clip which is not the last clip, then it proceeds to Step S35.

In Step S35, the edit list editing unit 55 adds the value of the variable ClipFrame to the variable FrameNum. In Step S36, it adds a value "1" to the variable ClipNum, so as to be ready for calculation in the following step.

After completing the processing in Step S36, the edit list editing unit 55 returns to Step S32 and repeats the ensuing processing.

The edit list editing unit 55 repeats the processing in Steps S32 to S36 as mentioned above, and it performs such processing on all the clips. It completes the above-mentioned processing for all the clips. If it judges in Step S34 that the clip is the last one, the edit list editing unit 55 completes the LTC editing processing and completes the clip metadata processing for edit list shown in FIG. 8.

As mentioned above, the edit list editing unit 55 performs the clip metadata processing to edit list (which has been described with reference to the flowchart shown in FIG. 8) and the LTC editing processing (which has been described with reference to the flowcharts shown in FIGS. 9 and 10). Thus, it generates the conversion table corresponding to the edit list.

Incidentally, the above-mentioned variable are merely exemplary, and it is possible to use other variables than those mentioned above.

The foregoing is about the process for LTC editing in which the LTC (corresponding to the video and audio data for editing) has continuous values in the clip. However, there may be an instance in which the LTC has discontinuous values in the clip (or the LTC has the change point in the clip). In this case the above-mentioned process for LTC editing may be carried out in the following manner. The value of LTC at the start point within the specified range of each clip and the frame number in the video data (video data after editing) on the edit list of the frame corresponding to the LTC are made to correspond to each other and registered in the conversion table. Similarly, the value of LTC and the frame number in the video data (video data after editing) on the edit list are made to correspond to each other and registered in the conversion table also for the change point of LTC of each clip (the frame to which LTC is added whose value is discontinuous with the value of LTC of the immediately preceding frame).

Incidentally, it was mentioned in the foregoing that if the edit list editing unit 55 judges (in Step S24 shown in FIG. 9) that the initial value of LTC is not entered by the user, then it substitutes a value "0" for the value of the variable LtcStart in Step S26. However, this procedure may be modified such that it acquires information about the actual current time through the communication unit 64 and registers the thus acquired value of the actual current time in the variable LtcStart.

The following is about how to generate the conversion table of LTC for edit list, said LTC corresponding to the essence data on the edit list (or the essence data after editing), in the editing work to reproduce one clip by synthesizing a plurality of clips. Incidentally, although the following description concerns only with the video data for editing, the actual procedure may be applied also to audio data, low-resolution data, and frame data.

Figure 11:
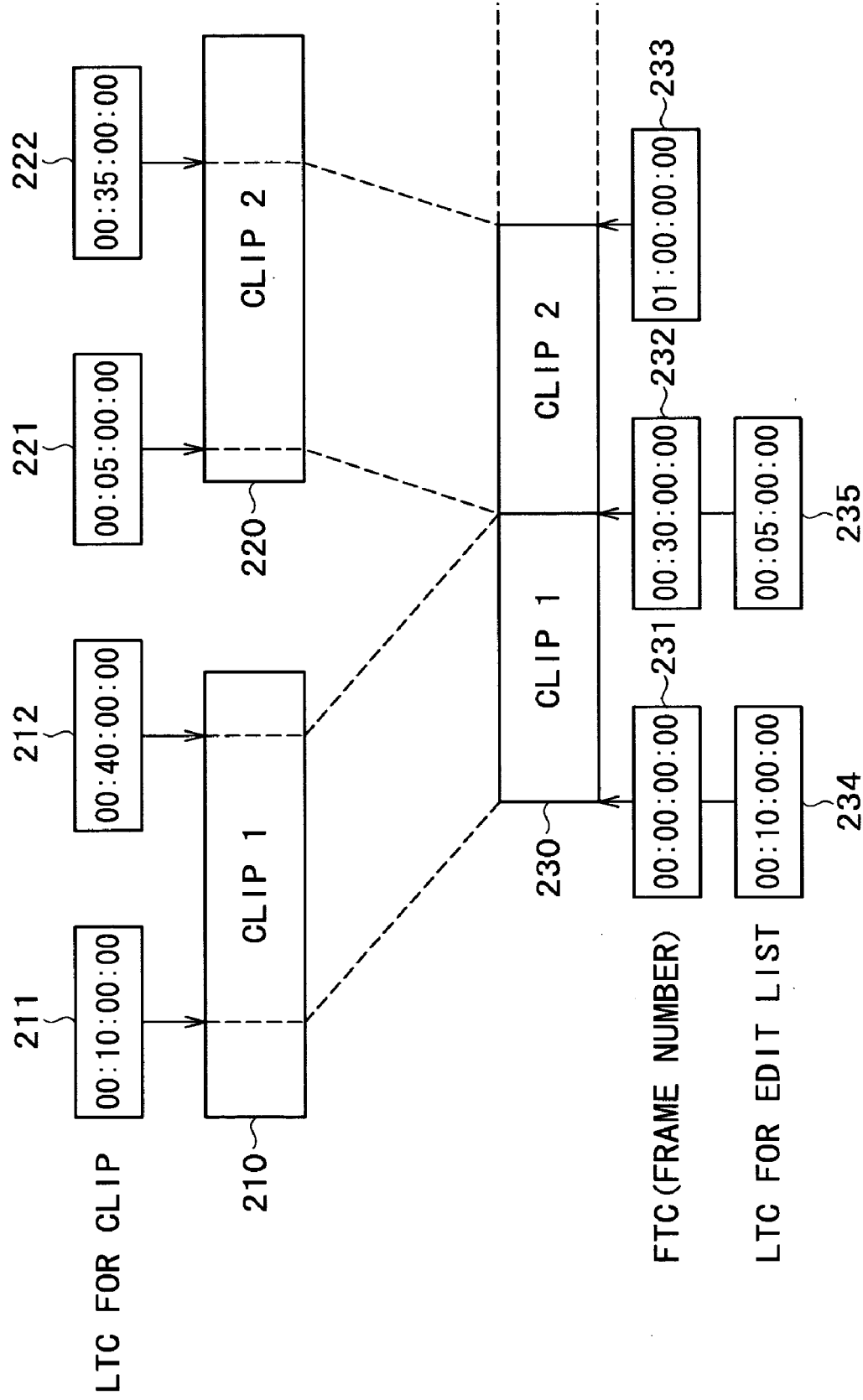
FIG. 11 is a diagram illustrating how to generate the LTC for the edit list.

FIG. 11 shows how to generate the LTC for edit list (the conversion table for edit list) in the editing work which does not involve the conversion table in which the unified new LTC is made to correspond to the video data as the editing result.

In FIG. 11, clip 1 and clip 2 are those clips which are recorded in the optical disk 17 (or which are to be edited). In other words, this editing work extracts part of the video data 210 of clip 1 and part of the video data 220 of clip 2 and combines them into one video data, which is the video data 230 on the edit list after editing.

The video data 210 and the video data 220 each have LTC (or LTC for clip) added thereto. LTC for clip is LTC contained in the frame metadata of clip before editing. In FIG. 11, "00:10:00:00" is the value of LTC 211 of the first frame (IN point) of the part extracted as the video data after editing (the video data 230 on the edit list) among all the frames of the video data 210.

"00:40:00:00" is the value of LTC 212 of the last frame (OUT point) of the part extracted as the video data after editing (the video data 230 on the edit list) among all the frames of the video data 210. Similarly, "00:05:00:00" is the value of LTC 221 at IN point of the video data 220, and "00:35:00:00" is the value of LTC 222 at OUT point.

The video and audio data of clips recorded in the optical disk 17 (as shown in FIG. 11) are usually the data which is obtained as the result of shooting by the imaging device 14, and hence such data does not yet undergo editing. In this case, the LTC for clip added to the video and audio data of clips to be edited usually does not have the discontinuous point (change point) at which the value is discontinuous in the preceding and following frames. Therefore, it is assumed in FIG. 11 for the purpose of brevity that the image data 210 or 220 does not have the change point at which the value of LTC is discontinuous. However, it may have the change point, as a matter of course.

Figure 10:
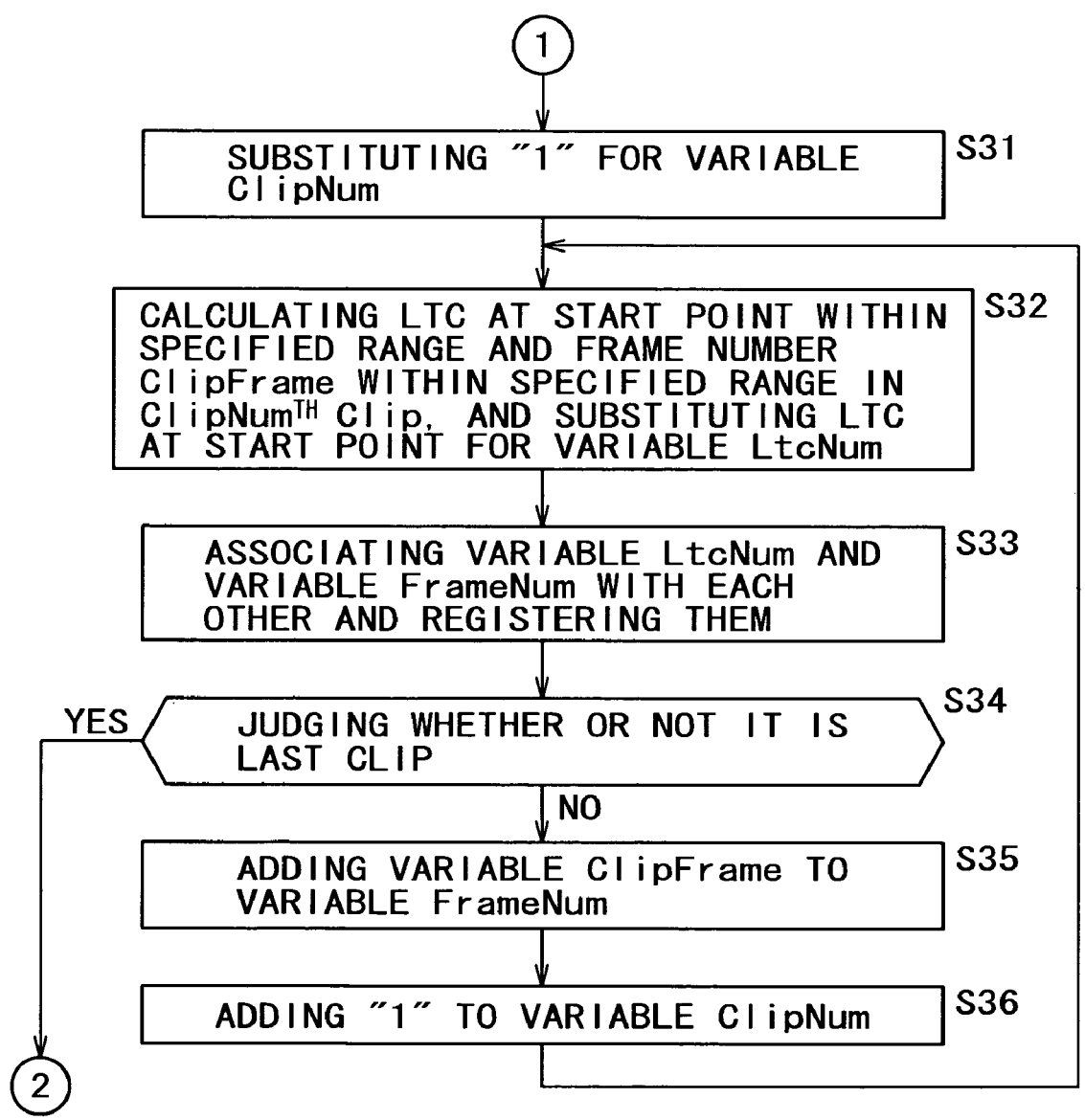
FIG. 10 is a flowchart that follows the flowchart shown in FIG. 9.

If the edit list editing unit 55 performs editing by using the video data 210 and 220 in such a way as to generate no conversion table that associates the unified new LTC with the video data 230 on the edit list after editing as mentioned above, then it performs the processing according to the flow-charts shown in FIGS. 9 and 10, so that it associates the FTC (frame number) and LTC (LTC for edit list) with each other and registers them, and it generates the conversion table corresponding to the video data 230 on the edit list.

In other words, registered in the conversion table are LTC for edit list and frame number (FTC) at IN point in the video data 210, and LTC for edit list and frame number (FTC) at IN point in the video data 220.

In FIG. 11, the value of FTC 231 at IN point of the video data 210 is "00:00:00:00" because it is the head frame of the video data 230, and the value of LTC 234 for edit list is "00:10:00:00" which is the same value as LTC for clip of the video data 210.

Also, at IN point of the video data 220, the value of FTC 232 is "00:30:00:00", with the frame number of the extracted video data 210 added to the value of FTC 231, and the value of LTC 235 for edit list is "00:05:00:00" which is identical with the value of LTC for clip of the video data 220.

The value of FTC 233 corresponding to OUT point in the video data 220 (which is the last frame in the part extracted from the video data 220, and which is not registered in the conversion table) becomes "01:00:00:00", with the number of frames of the extracted video data added to the value of FTC 232.

There may exist an instance in which the value of LTC for edit list is discontinuous if the conversion table corresponding to edit list is generated by utilizing the clip LTC corresponding to the data before editing without generating the conversion table which associates the unified new LTC with the video data as the editing results.

Figure 12:
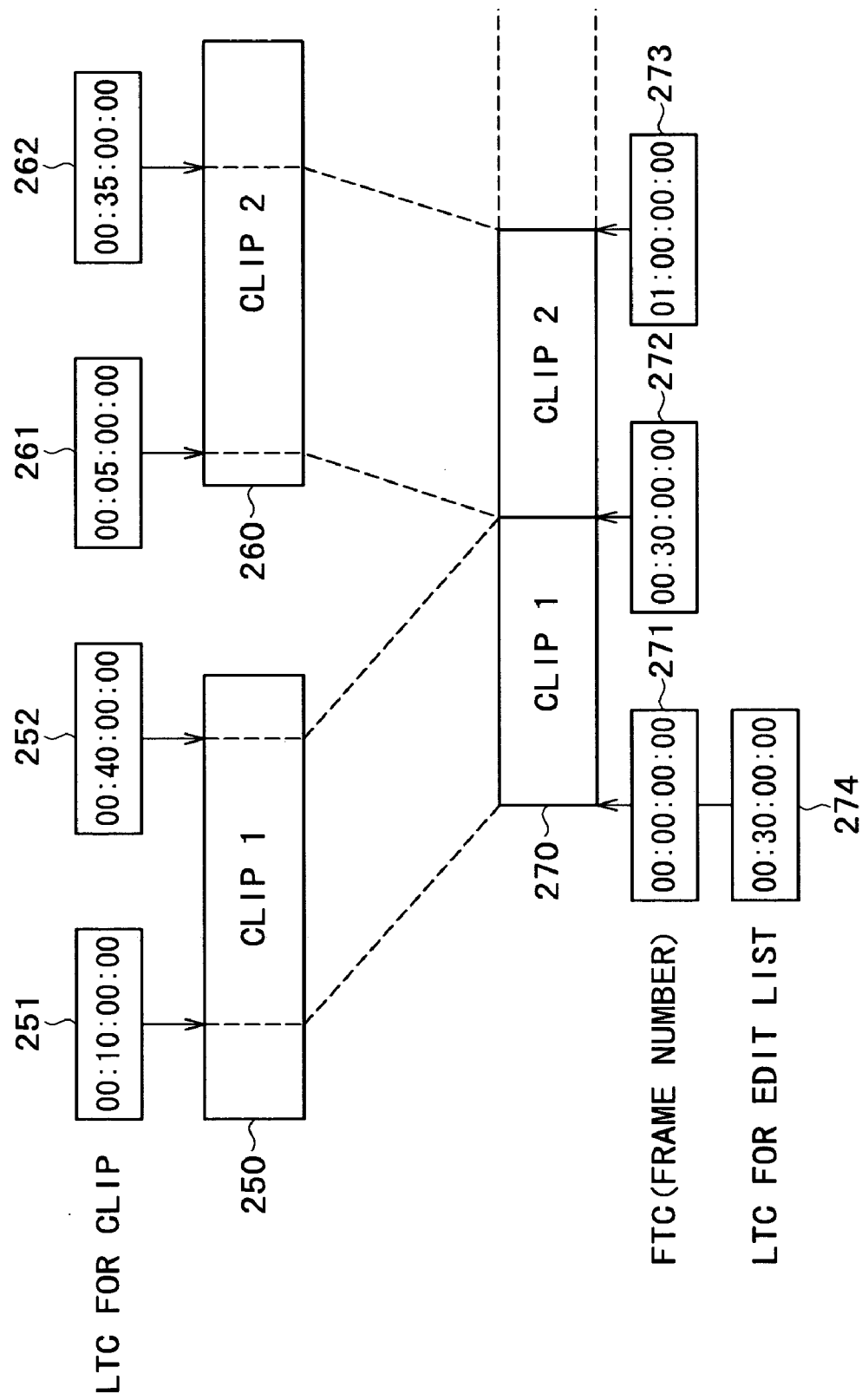
FIG. 12 is another diagram illustrating how to generate the LTC for the edit list.

FIG. 12 shows how to generate the LTC for edit list (the conversion table for edit list) in the editing work which involves the conversion table in which the unified new LTC is made to correspond to the video data as the editing result.

In FIG. 12, clip 1 and clip 2 are those clips which are to be edited, as in the case shown in FIG. 11. In other words, this editing work extracts part of the video data 210 of clip 1 and part of the video data 220 of clip 2 and combines them into one video data, which is the video data 230 on the edit list after editing.

The video data 250 and the video data 260 each have LTC (or LTC for clip) added thereto. LTC for clip is LTC contained in the frame metadata of clip before editing. In FIG. 12, "00:10:00:00" is the value of LTC 251 at IN point of the video data 250.

"00:40:00:00" is the value of LTC 252 at OUT point of the video data 250. Similarly, "00:05:00:00" is the value of LTC 261 at IN point of the video data 260, and "00:35:00:00" is the value of LTC 262 at OUT point. For the purpose of brevity, it is assumed, as in FIG. 11, that the image data 250 or 260 does not have the change point at which the value of LTC is discontinuous. However, it may have the change point, as a matter of course.

If the edit list editing unit 55 performs editing by using the video data 250 and 260 in such a way as to generate the conversion table that associates the unified new LTC with the video data 270 on the edit list after editing as mentioned above, then it performs the processing according to the flow-charts shown in FIG. 9, so that it associates the FTC (frame number) and LTC (LTC for edit list) with each other and registers them, and it generates the conversion table corresponding to the video data 270 on the edit list.

In other words, only LTC for edit list and frame number (FTC) corresponding to IN point in the video data 250 are registered in the conversion table.

In FIG. 12, "00:00:00:00" is the value of FTC 271 in the frame corresponding to IN point of the video data 250, which is the head frame of the image data 270, and the value of LTC 274 for edit list is "00:30:00:00" which is different from the value of LTC 251 for clip of the video data 250, which is the initial value set by the user.

Also, at IN point of the video data 220, the value of FTC 232 is "00:30:00:00", with the frame number of the extracted video data 210 added to the value of FTC 231, and the value of LTC 235 for edit list is "00:05:00:00" which is identical with the value of LTC for clip of the video data 220.

The values of FTC 272 and FTC 273 corresponding respectively to IN point and OUT point in the video data 260 (which are not registered in the conversion table) becomes "00:30:00:00" and "01:00:00:00", respectively.

In the case where the conversion table is generated which associates the unified new LTC with the image data as the editing result, the thus generated conversion table corresponding to edit list does not have the discontinuous point (change point) registered, except for the start point mentioned above. Therefore, the LTC for edit list corresponding to the image data 270 on the edit list is the LTC in which values are continuous (or there are no discontinuous points).

The conversion table contained in the clip metadata for edit list (or the conversion table corresponding to LTC for edit list), which has been generated by editing as shown in FIGS. 11 and 12, has the structure which is explained below with reference to FIG. 13.

Figure 13A:
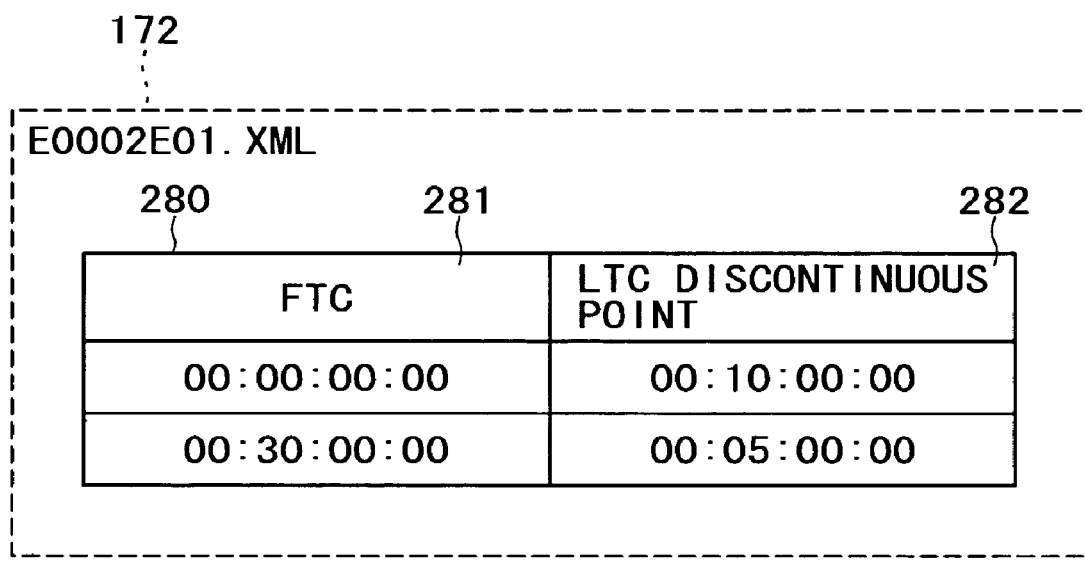
FIG. 13A is a schematic diagram showing an example of the structure of the conversion table corresponding to the edit list.

FIG. 13A is a schematic diagram showing the structure of the conversion table generated by editing shown in FIG. 11. This conversion table is metadata which does not need to be in real time and which is generated at each time of editing. Therefore, it is recorded in the clip metadata file for edit list under the edit list directory.

In the case of FIG. 13A, the conversion table 280 is recorded in the clip metadata file (E0002M01.XML) 172, which has been described with reference to FIG. 6. As mentioned above, the conversion table 280 is a table composed of the frame number (FTC) 281 and the LTC discontinuous point 282. In this case, the start point (IN point of clip 1 in FIG. 11) and the change point (IN point of clip 2 in FIG. 11) are registered as discontinuous points.

Figure 13B:
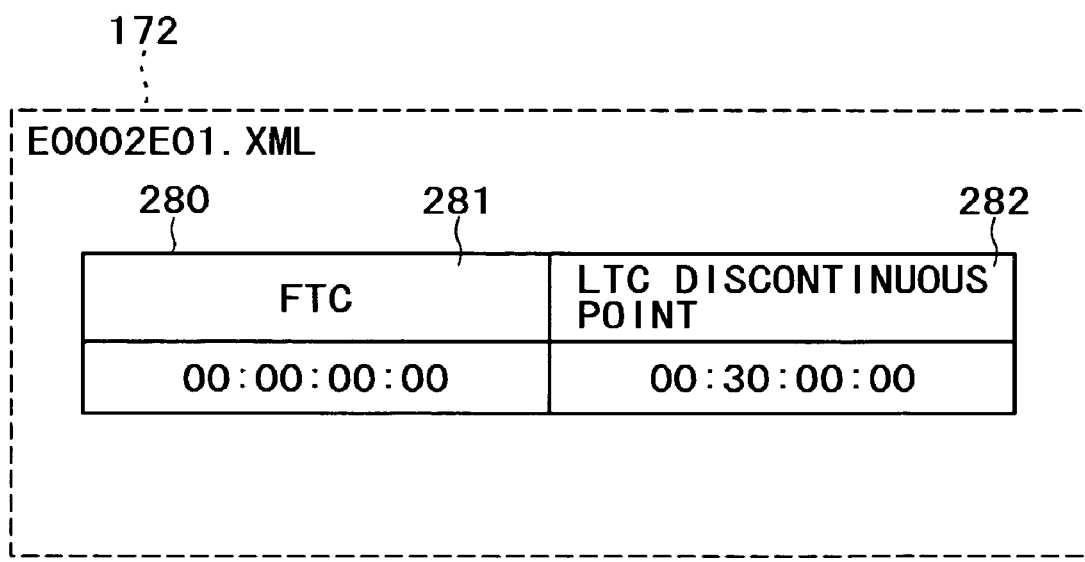
FIG. 13B is another schematic diagram showing an example of the structure of the conversion table corresponding to the edit list.

FIG. 13B is a schematic diagram showing the structure of the conversion table generated by editing shown in FIG. 12. This conversion table is metadata which does not need to be in real time and which is generated at each time of editing. Therefore, it is recorded in the clip metadata file for edit list under the edit list directory.

In the case of FIG. 13B, the conversion table 280 is recorded in the clip metadata file (E0002M01.XML) 172, which has been described with reference to FIG. 6. As mentioned above, the conversion table 280 is a table composed of the frame number (FTC) 281 and the LTC discontinuous point 282. In this case, only the start point (IN point of clip 1 in FIG. 12) is registered as discontinuous points. In this case, however, in the LTC discontinuous point 282 is registered the initial value which has been set up by the user at the time of editing.

As mentioned above, the nondestructive editing is accomplished in such a way that the clip metadata corresponding to the edit list is generated. In this way it is possible to easily add the new LTC to the essence data as the editing result without updating the data to be edited.

The user utilizes the new LTC to easily retrieve the desired frame from the editing result, and hence the user can accomplish the subsequent editing easily. Also, in the case where the essence data after editing is reproduced (or to reproduce the editing result) by using the edit list, the apparatus that performs playback can add LTC to the playback data simply by reading the conversion table corresponding to the new LTC. This helps reduce time and load for playback.

Incidentally, in actual, there are several playback operations, such as rapid playback, rewind-playback, suspend, and frame-by-frame playback, in addition to those mentioned above. However, their description is omitted because they can be accomplished by determining the read start position (frame) by using the above-mentioned reading process and controlling the reading to carry out the playback operation.

Description in the foregoing has been made on the assumption that the data that needs to be in real time is the frame metadata which is metadata for each frame. This description is not limitative; it may be metadata for the essence data in any unit; for example, it may be metadata for each of a plurality of frames.

Also, the foregoing description has been made on the assumption that the data that does not need to be in real time is the clip metadata which is metadata for each clip. This description is not limitative; it may be metadata for the essence data in any unit; for example, it may be metadata for each of a plurality of clips, or it may be metadata for the essence data for a previously determined time.

Incidentally, the foregoing description has been made on the assumption that the optical disk is used to record therein video data, audio data, low-resolution data, frame metadata, clip metadata, edit list, etc. The recording medium for these data is not limited to the optical disk; it includes magneto-optical disk, magnetic disk (flexible disk and hard disk), magnetic tape, and semiconductor memory (flash memory).

Also, the foregoing description has been made on the assumption that the editing terminal device 16 is used for editing. Any other information processing devices may be used for editing. They include, for example, the planning terminal device 11, the imaging device 14, or the field PC 15, which are shown in FIG. 1.

As mentioned above, the information processing device to which the present invention is applied edits video data (which is not yet edited), generates video data (which has been edited), records the thus generated and edited video data in a directory different from the one for video data (which it not yet edited), and generates and records new metadata which does not need to be in real time, corresponding to the video data after editing, according to the metadata which does not need to be in real time which has been added to the video data before editing. The processing is not specifically restricted so long as it is similar to that mentioned above, and it includes other processing. Also, the information processing device to which the present invention is applied may have the other structure than that shown in FIG. 2.

A series of processes mentioned above may be executed by means of hardware or software as mentioned above. Various functions may be achieved by means of a general-purpose personal computer in which a special program is installed from a recording medium.

The recording medium may be the removal medium 71 which is separate from the editing terminal device 16 shown in FIG. 2. It includes magnetic disk (including flexible disk), optical disk (including CD-ROM [Compact Disc Read Only Memory] and DVD [Digital Versatile Disc]), magneto-optical disk (MD® [Mini-Disc]), and semiconductor memory (package medium), which are used to distribute the program among users. The recording medium (with the program installed therein) may also be supplied to the user after it has been incorporated into the computer. In this case, the program is stored in the ROM 52 or the memory unit 63 (hard disk).

In this specification, the steps describing the program written in the medium may be processed in time sequence in the order described or processed in parallel or individually.

Also, the term "system" as used in this specification denotes a whole body constructed of a plurality of devices.

Exploitation in Industry

As mentioned above, the present invention permits video and audio data to be recorded in a recording medium. In addition, it permits the recording medium to be used conveniently for editing.

The invention claimed is:

1. An information processing device comprising:
   an edit list editing unit configured to associate frame numbers (FTCs) with linear time codes (LTCs);
   wherein a first one of the linear time codes (LTCs) is the frame value of video data at the start point of a first clip, said first clip being a portion of said video data to be edited,
   wherein a first one of the frame numbers (FTCs) is the frame value for the head frame of image data, said image data being parts of said video data after editing.

2. The information processing device as defined in claim 1, wherein said video data to be edited is stored separate and apart from said image data.

3. The information processing device as defined in claim 1, further comprising:
   a memory unit configured to store an edit list, said frame numbers (FTCs) associated with said linear time codes (LTCs) being stored on said edit list.

4. The information processing device as defined in claim 3, wherein said image data is on said edit list.

5. The information processing device as defined in claim 1, wherein said first one of the frame numbers (FTCs) is associated with said first one of the linear time codes (LTCs).

6. The information processing device as defined in claim 1, wherein a second one of the frame numbers (FTCs) is the sum of the frame value for number of frame extracted from said first clip and said first one of the frame numbers (FTCs).

7. The information processing device as defined in claim 6, wherein said second one of the frame numbers (FTCs) is associated with said second one of the linear time codes (LTCs).

8. The information processing device as defined in claim 7, wherein said second one of the linear time codes (LTCs) is the frame value of video data at the start point of a second clip, said second clip being another portion of said video data to be edited.

9. The information processing device as defined in claim 8, wherein said first clip and said second clip are combined into said image data.

10. The information processing device as defined in claim 9, wherein a third one of the frame numbers (FTCs) is the sum of the frame value for number of frame extracted from said second clip and said second one of the frame numbers (FTCs).

11. An information processing method comprising:
    extracting a first clip from video data, a first one of the linear time codes (LTCs) being the frame value of video data at the start point of a first clip;
    associating said first one of the linear time codes (LTCs) with a first one of the frame numbers (FTCs), said first one of the frame numbers (FTCs) being the frame value for the head frame of image data.

12. The information processing method as defined in claim 11, further comprising:
    storing said video data to be edited separate and apart from said image data, said image data being parts of said video data after editing.

13. The information processing method as defined in claim 12, further comprising:
    calculating a second one of the frame numbers (FTCs), said second one of the frame numbers (FTCs) being the sum of the frame value for number of frame extracted from said first clip and said first one of the frame numbers (FTCs).

14. The information processing method as defined in claim 11, further comprising:
    extracting a second clip from said video data, a second one of the linear time codes (LTCs) being the frame value of video data at the start point of a second clip;
    combining said first clip and said second clip into said image data.

15. The information processing method as defined in claim 14, further comprising:
    associating said second one of the linear time codes (LTCs) with a second one of the frame numbers (FTCs).

16. The information processing method as defined in claim 14, further comprising:
    calculating a third one of the frame numbers (FTCs), said third one of the frame numbers (FTCs) being the sum of the frame value for number of frame extracted from said second clip and said second one of the frame numbers (FTCs).

* * * * *